US007552187B2

(12) United States Patent
Fuchs

(10) Patent No.: US 7,552,187 B2
(45) Date of Patent: Jun. 23, 2009

(54) SYSTEM AND METHOD FOR AUTOMATICALLY EXECUTING CORRESPONDING OPERATIONS ON MULTIPLE MAPS, WINDOWS, DOCUMENTS, AND/OR DATABASES

(75) Inventor: Gil Fuchs, Menlo Park, CA (US)

(73) Assignee: Tele Atlas North America, Inc., Lebanon, NH (US)

( * ) Notice: Subject to any disclaimer, the term of this patent is extended or adjusted under 35 U.S.C. 154(b) by 742 days.

(21) Appl. No.: 11/158,789

(22) Filed: Jun. 22, 2005

(65) Prior Publication Data

US 2006/0294418 A1   Dec. 28, 2006

(51) Int. Cl.
*G06F 15/16* (2006.01)
(52) U.S. Cl. .................. 709/208; 709/205; 715/804
(58) Field of Classification Search ................ 709/201, 709/205, 208–209; 707/201; 715/804
See application file for complete search history.

(56) References Cited

U.S. PATENT DOCUMENTS

| 5,870,301 | A  | * | 2/1999  | Yakushiji et al. ............... 700/3 |
| 6,539,445 | B1 | * | 3/2003  | Krum ........................... 710/110 |
| 6,615,223 | B1 |   | 9/2003  | Shih et al. |
| 2002/0062377 | A1 | * | 5/2002 | Hillman et al. ............. 709/227 |
| 2002/0147784 | A1 | * | 10/2002 | Gold et al. .................. 709/208 |
| 2003/0126133 | A1 |   | 7/2003 | Dattatri et al. |
| 2003/0158886 | A1 | * | 8/2003 | Walls et al. ................. 709/201 |
| 2004/0172425 | A1 |   | 9/2004 | Edelstein et al. |
| 2005/0102440 | A1 | * | 5/2005 | Higaki et al. .................. 710/5 |

FOREIGN PATENT DOCUMENTS

JP    2000-206875 A    7/2000

* cited by examiner

*Primary Examiner*—Salad Abdullahi
(74) *Attorney, Agent, or Firm*—Fliesler Meyer LLP

(57) ABSTRACT

A system and method for causing a master operation that is executed on a master map, window, document, or database to also be automatically executed in its corresponding form on one or more slave maps, windows, documents, and/or databases. Embodiments of the invention can operate with masters and slaves that are initially either open or closed or both, depending on the operator's desires and the current state of the computing device. Embodiments of the invention are capable of opening masters and/or slaves that are closed. In some embodiments, the event handler capable of receiving the selections of master and slave(s) is part of the operating system and in other embodiments it is separate from the operating system. All embodiments operate with one master and with one or more slaves. In certain embodiments, the master and/or one or more slaves and/or the operation will be selected by default.

31 Claims, 31 Drawing Sheets

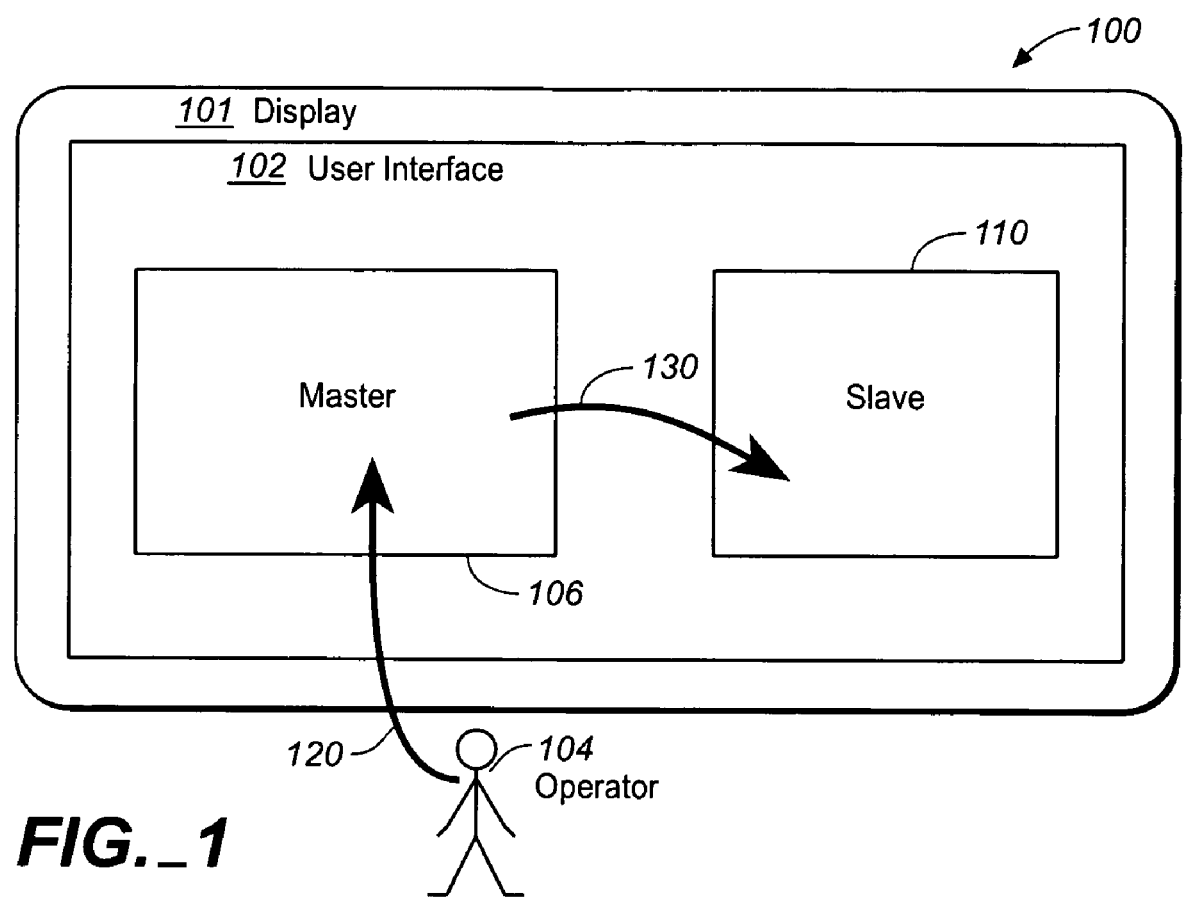
FIG._1

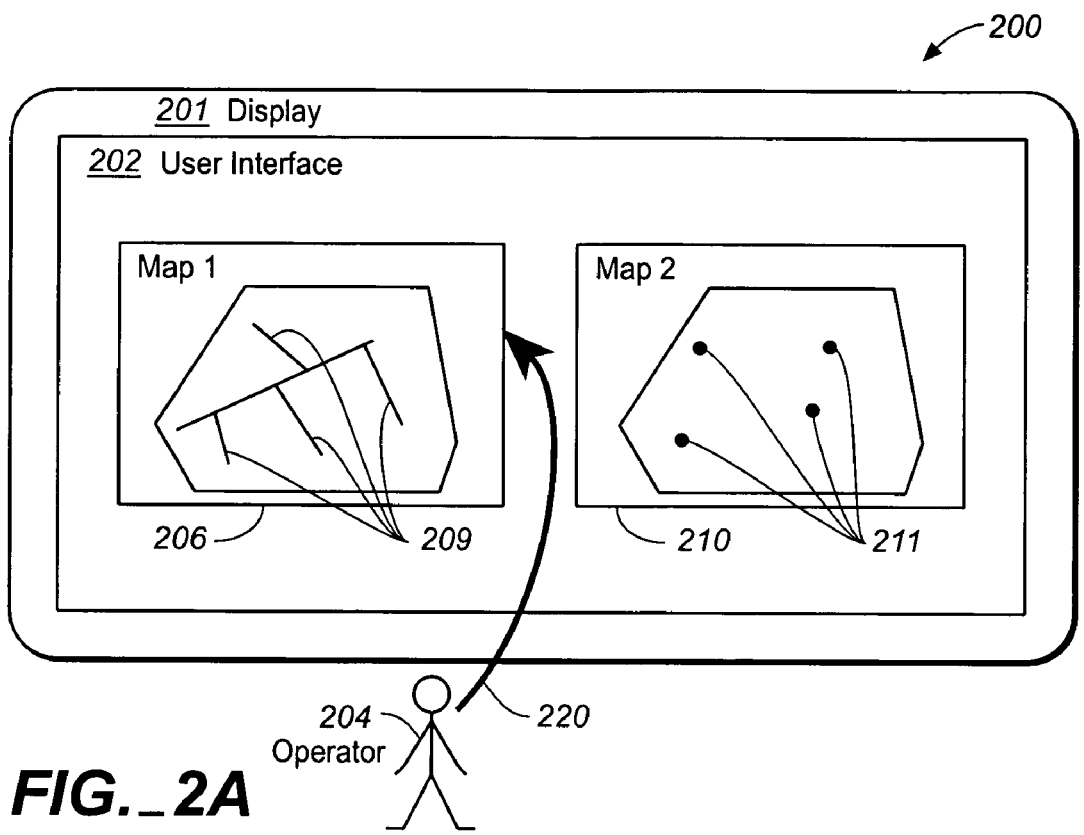
FIG._2A
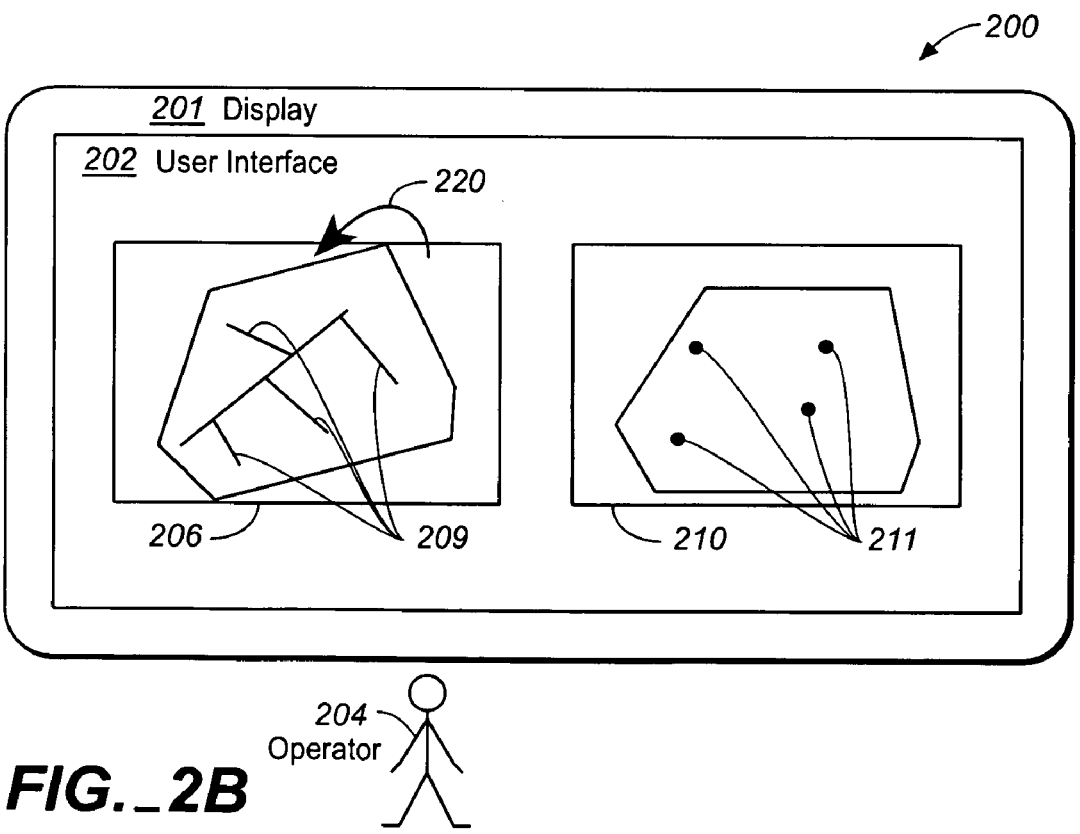
FIG._2B

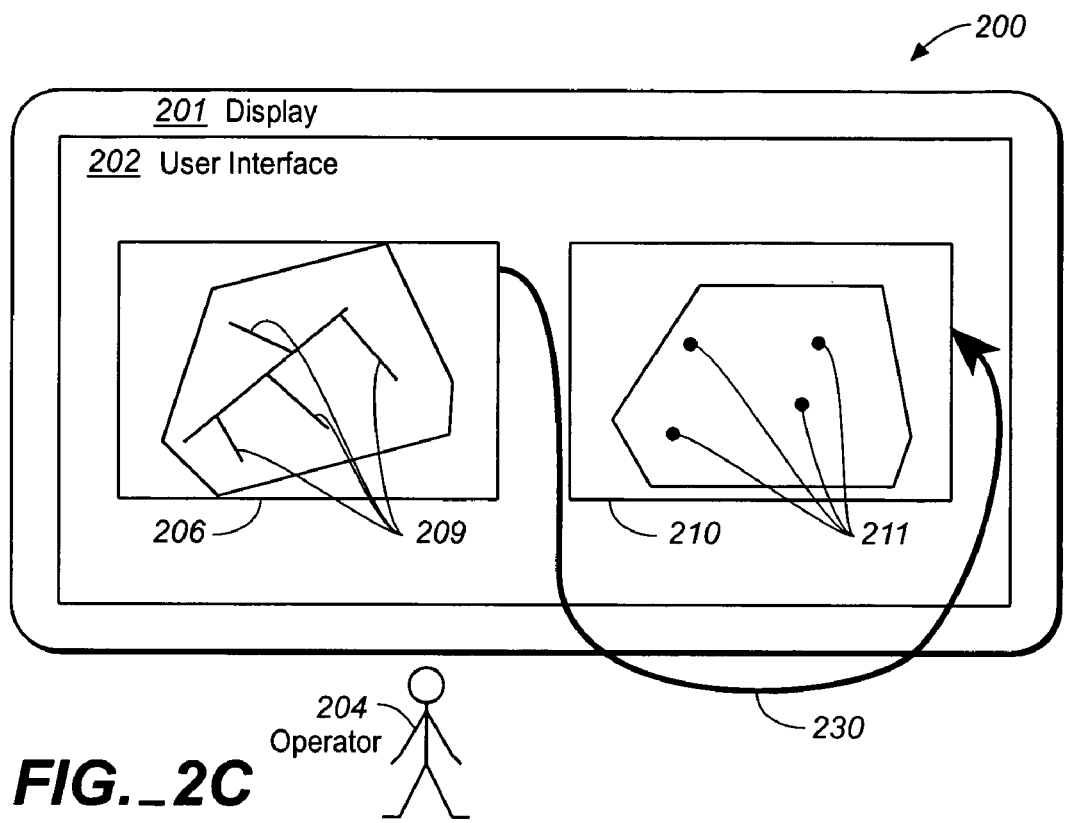
FIG._2C
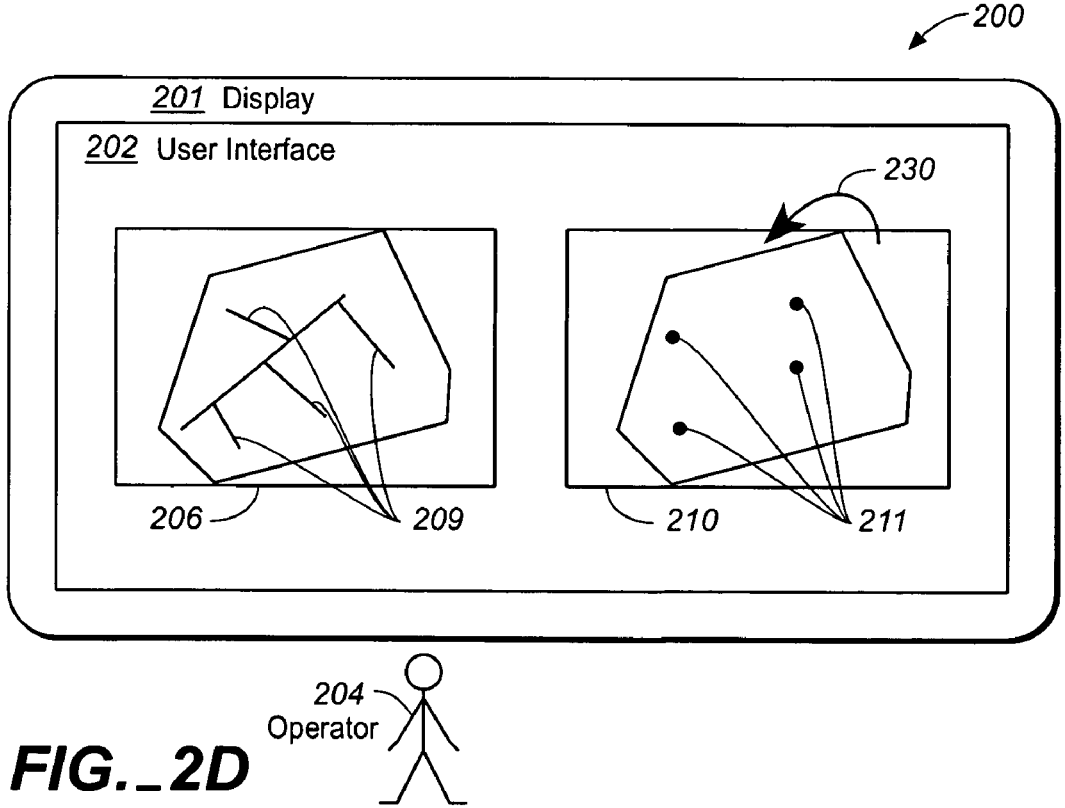
FIG._2D

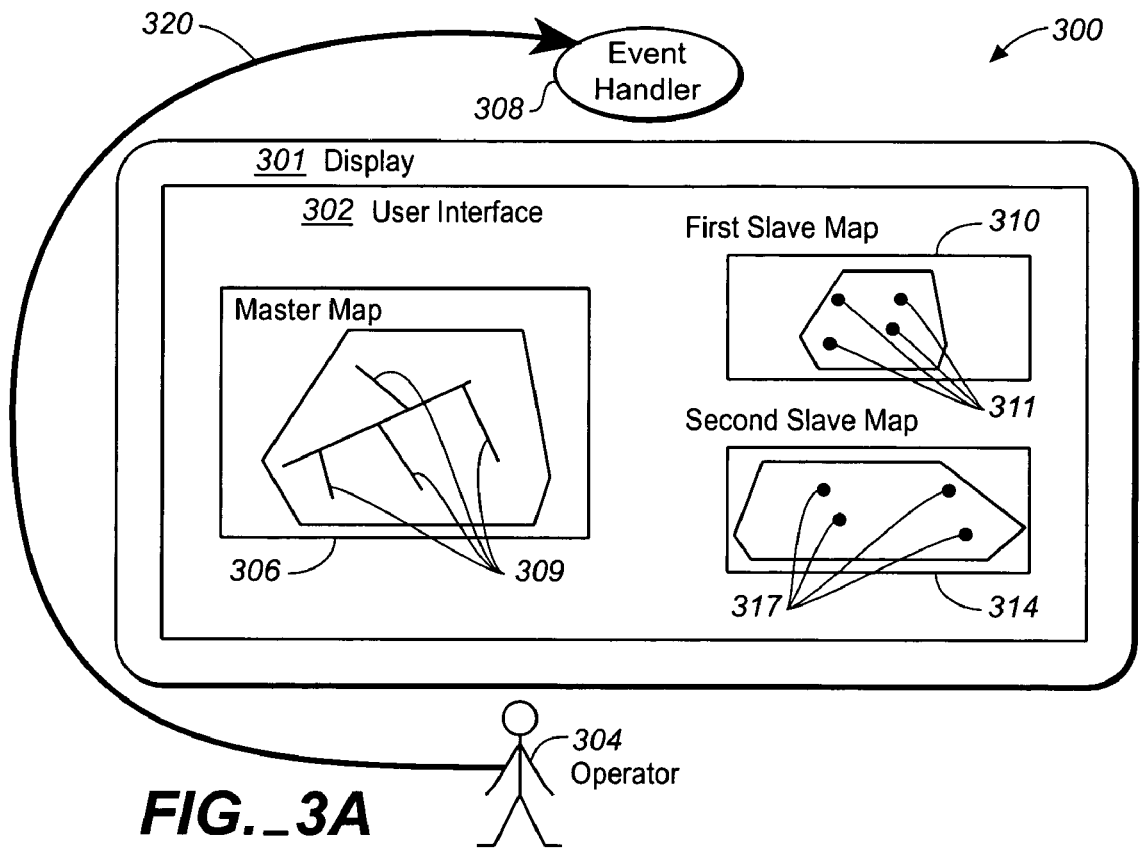
FIG._3A
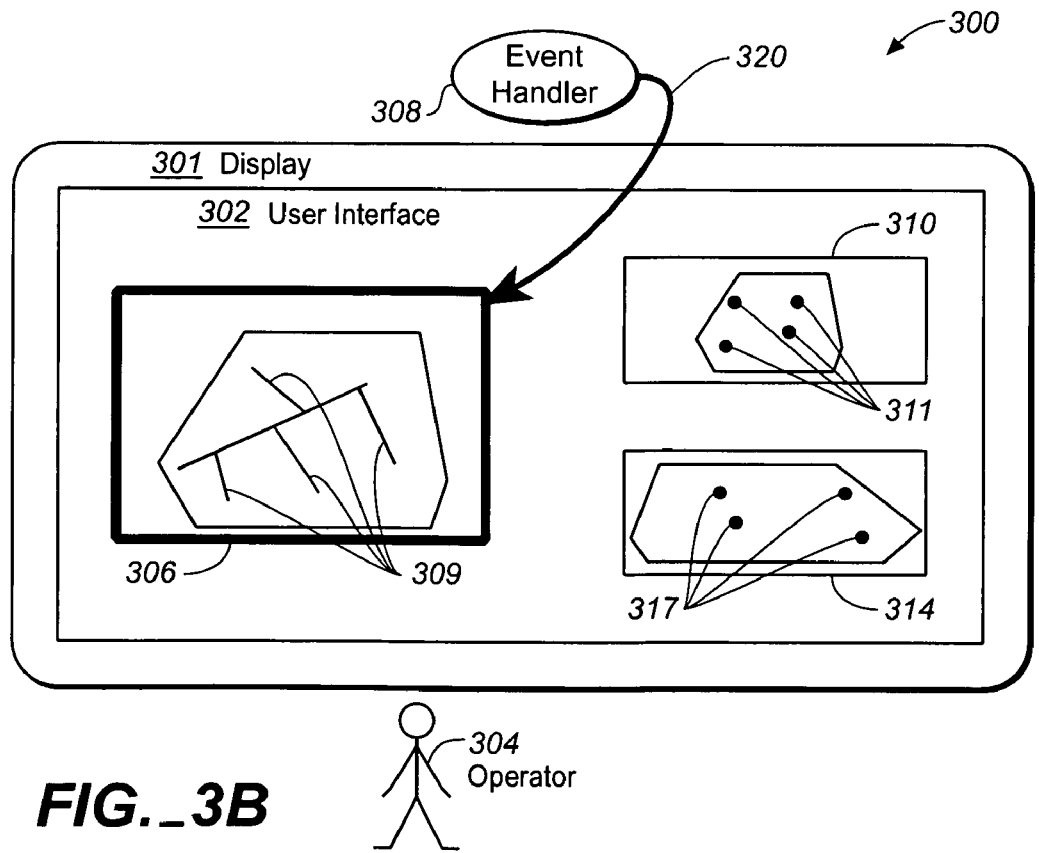
FIG._3B

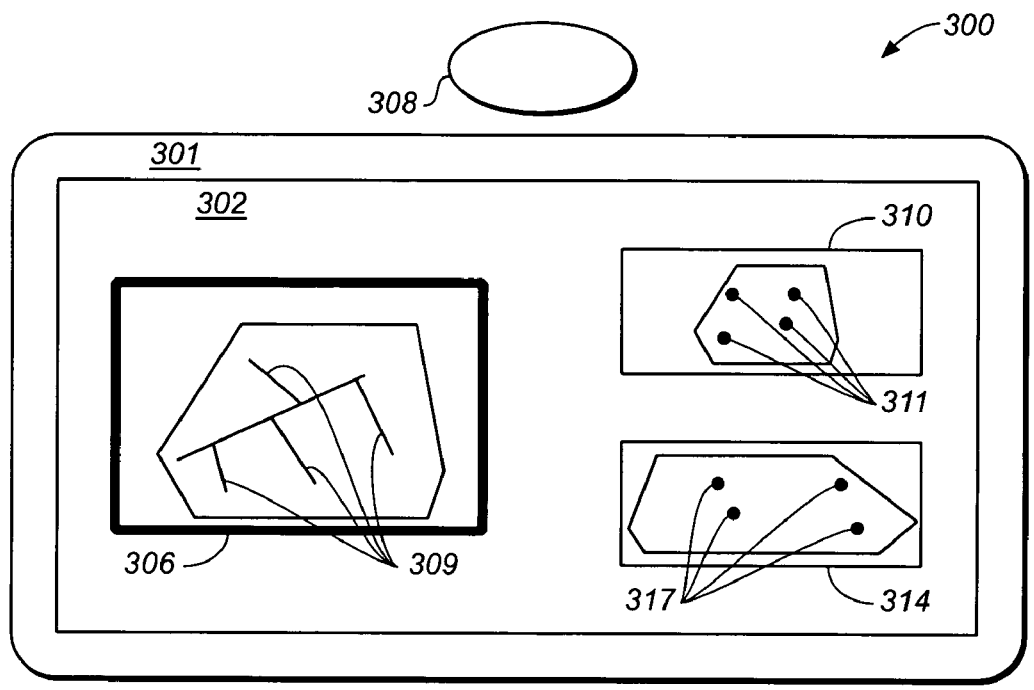
FIG._3C
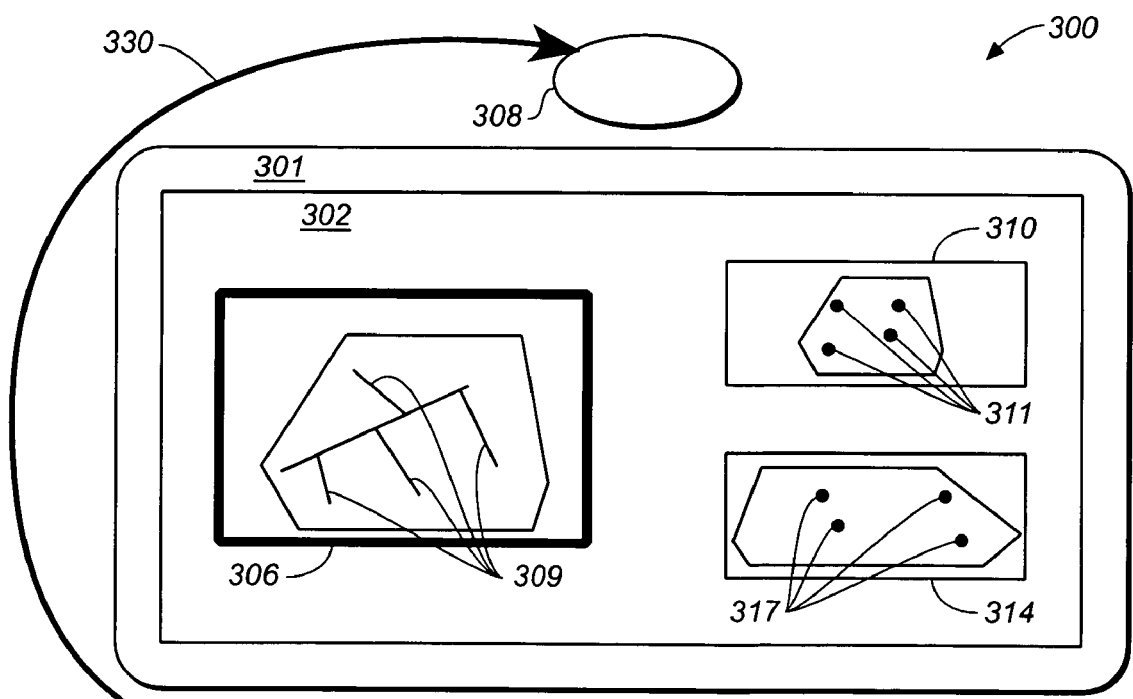
FIG._3D

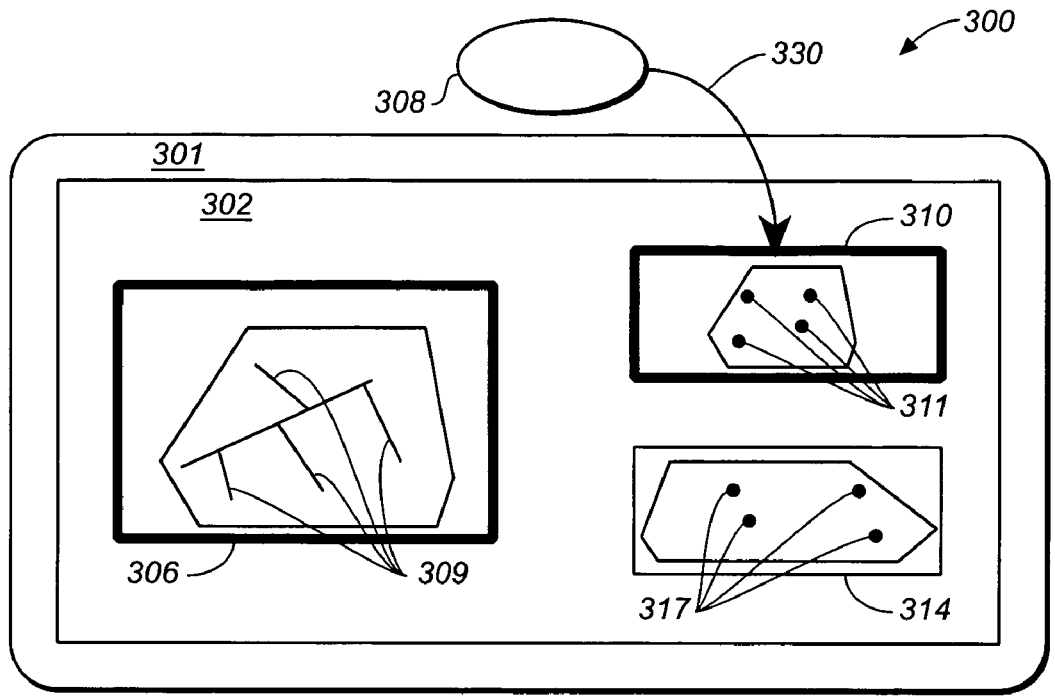
FIG._3E
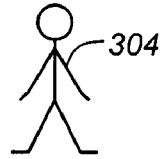
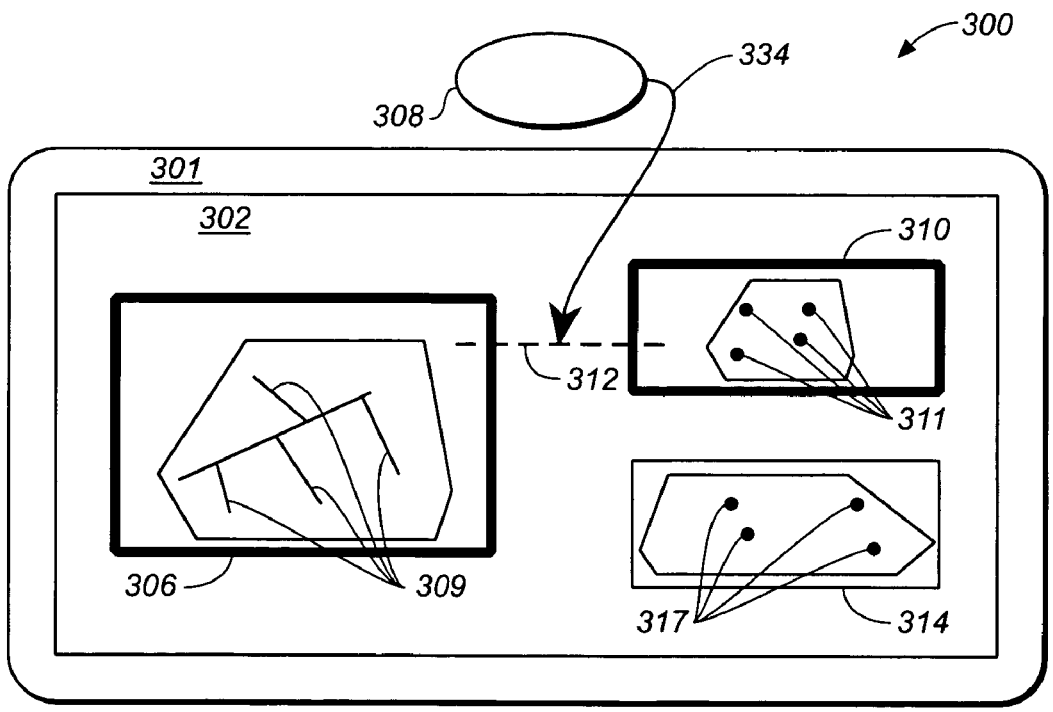
FIG._3F

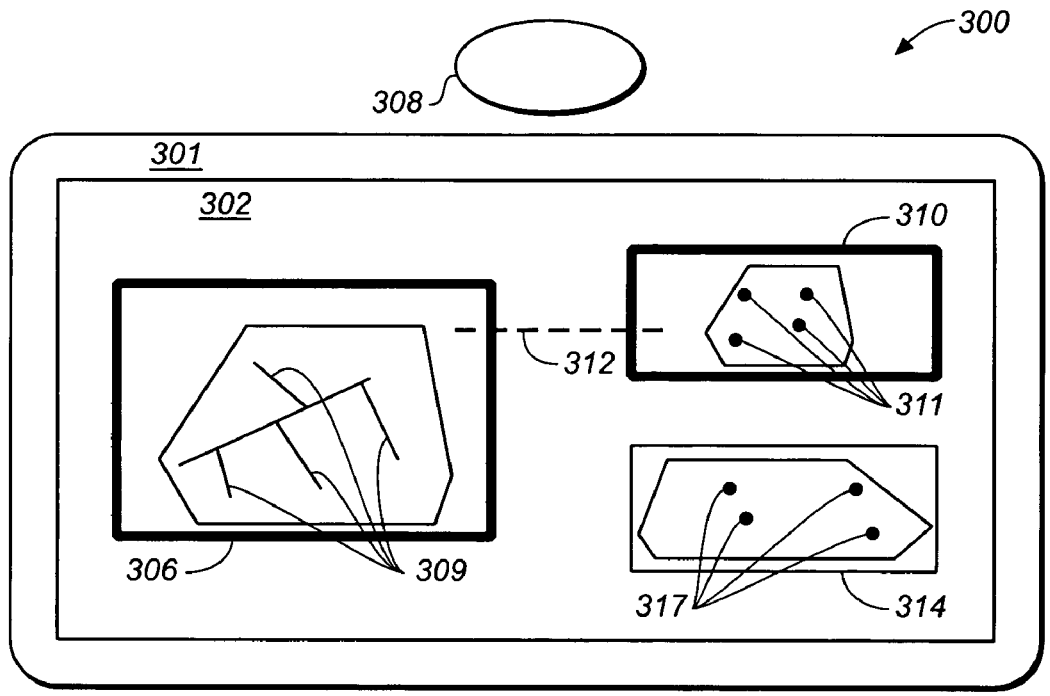
*FIG._3G*
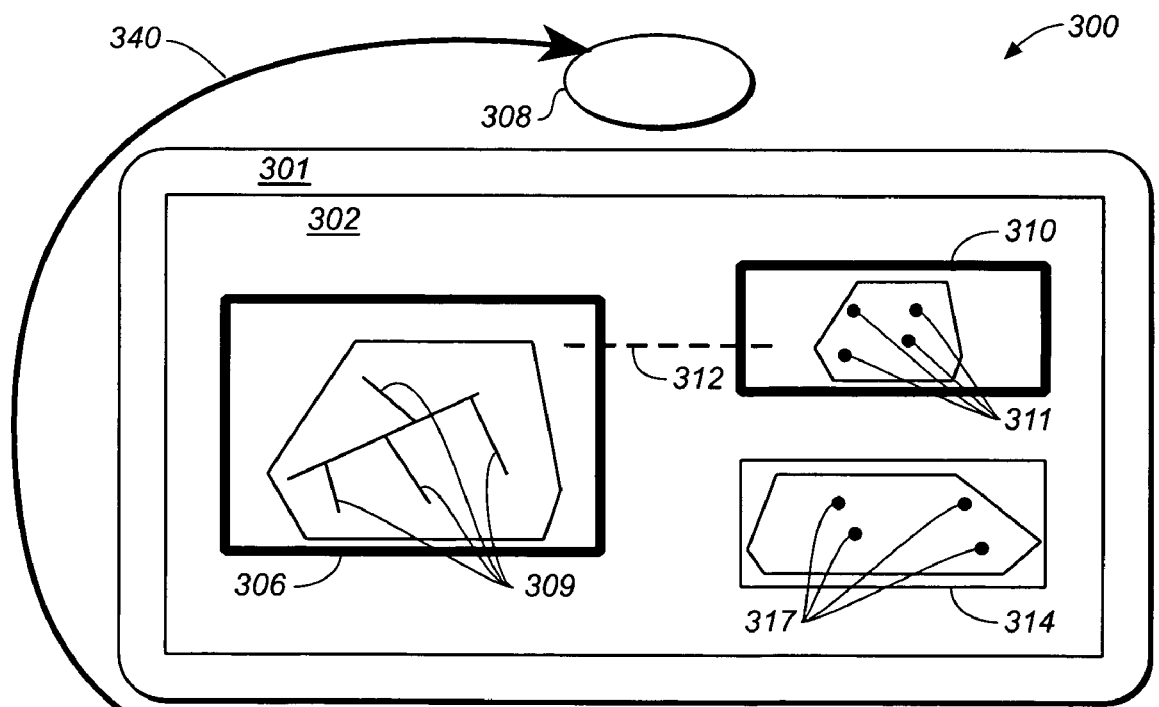
*FIG._3H*

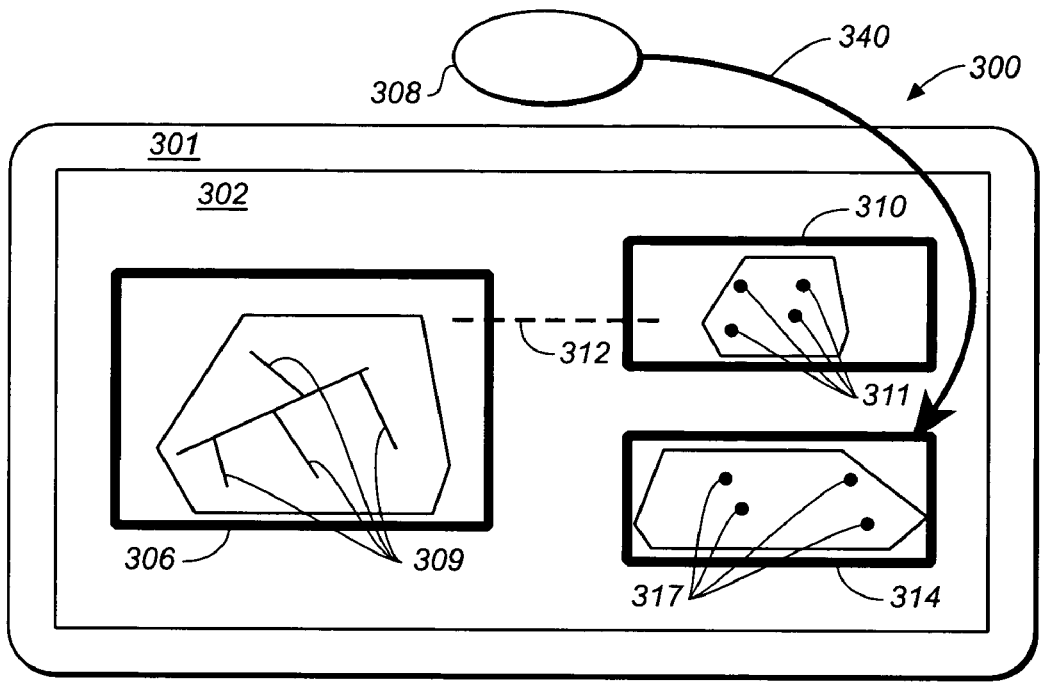
FIG._3I
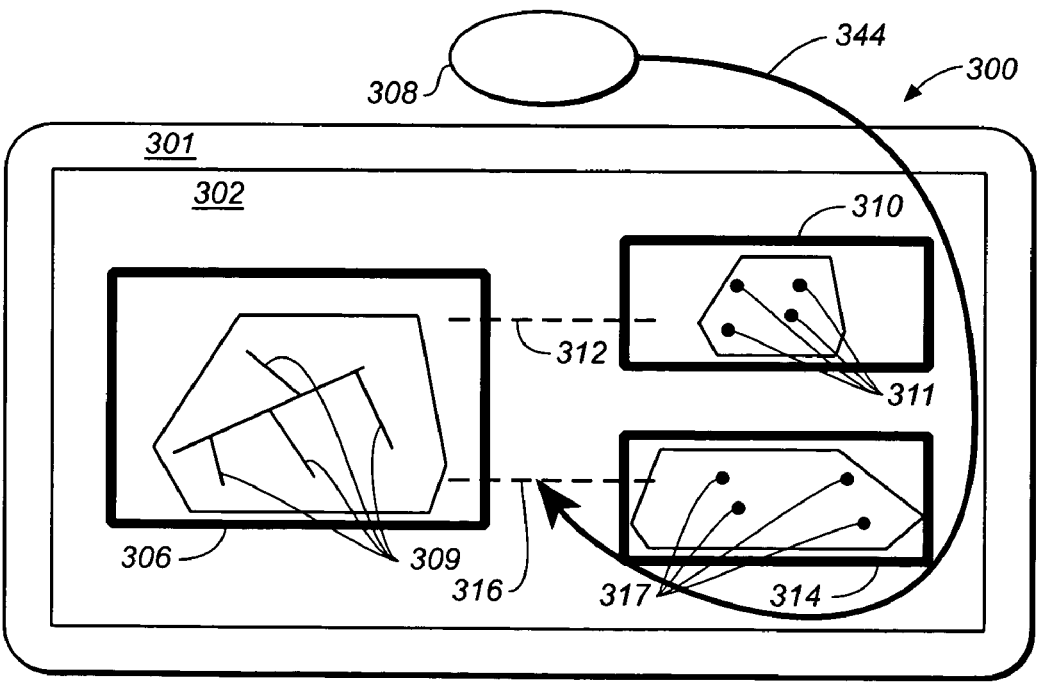
FIG._3J

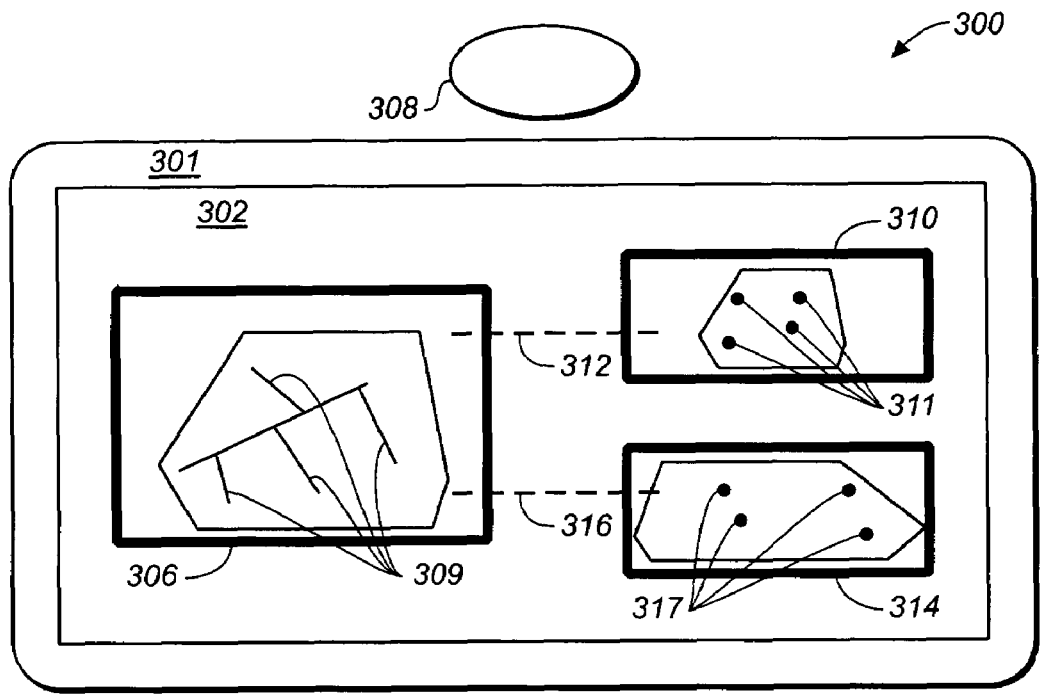
FIG._3K
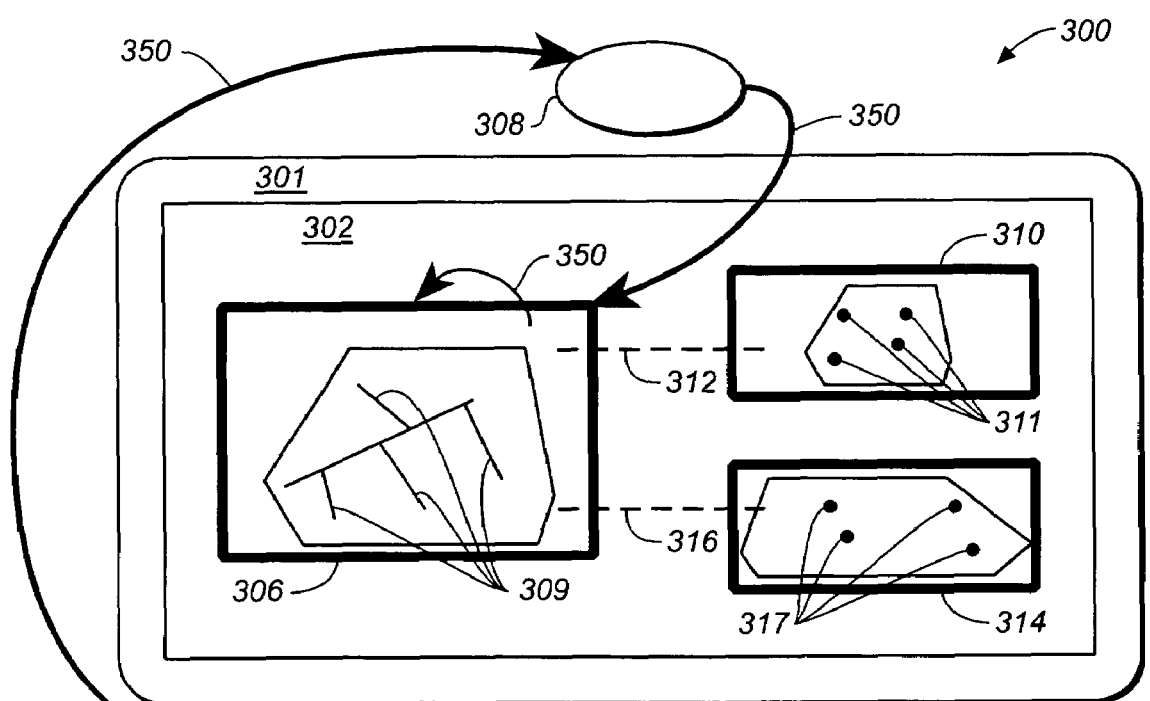
FIG._3L

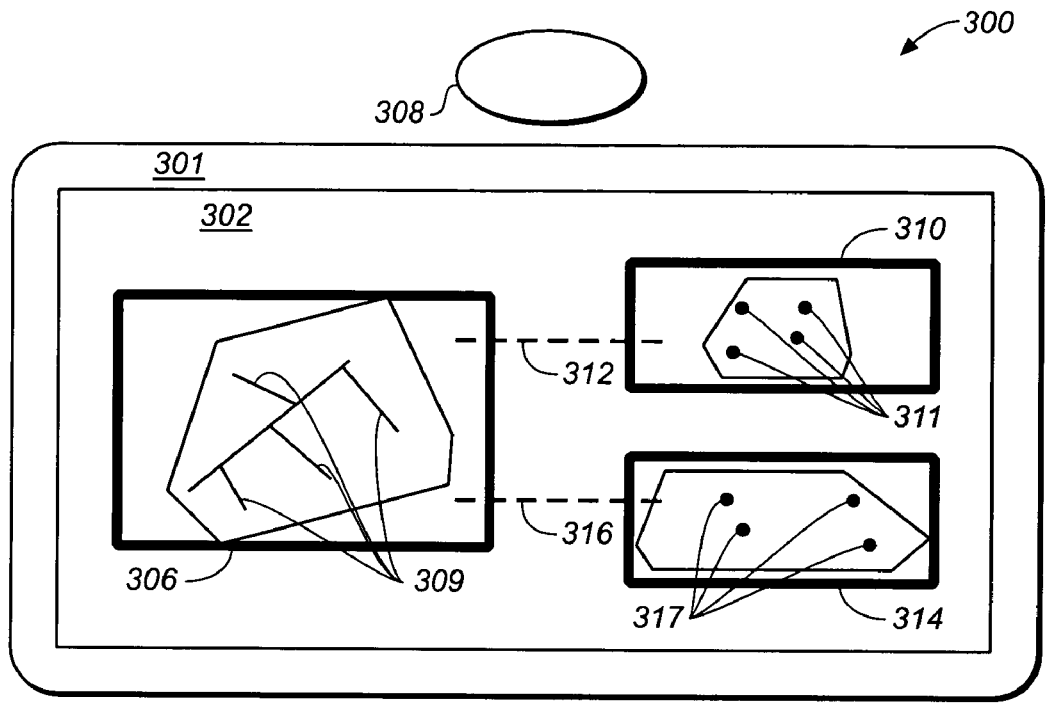
FIG._3M
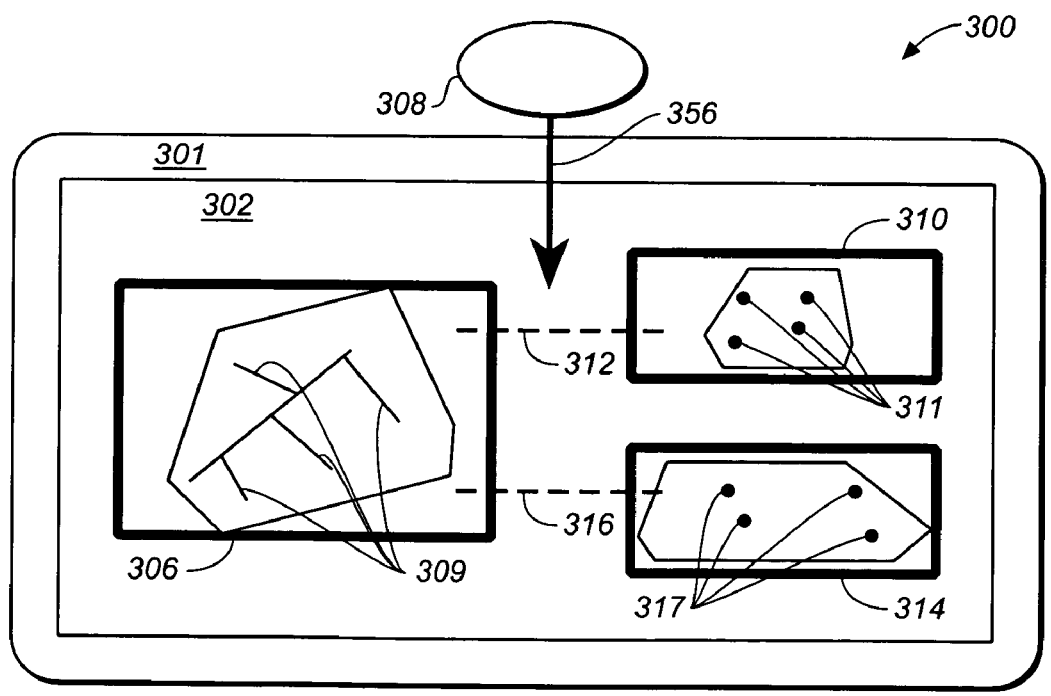
FIG._3N

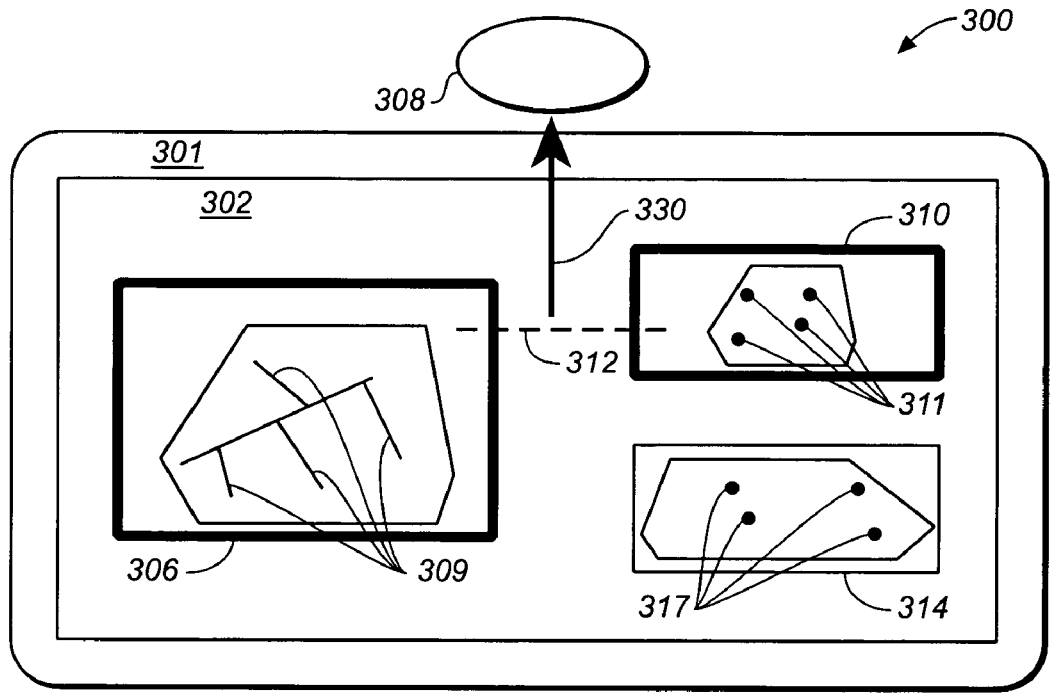
FIG._3O
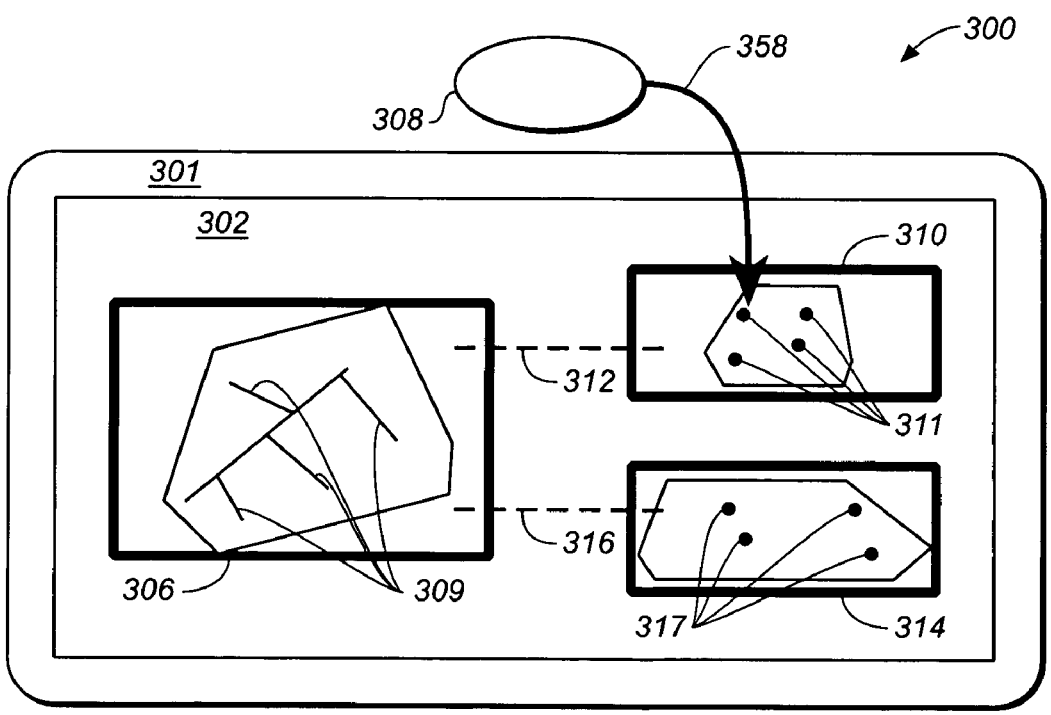
FIG._3P

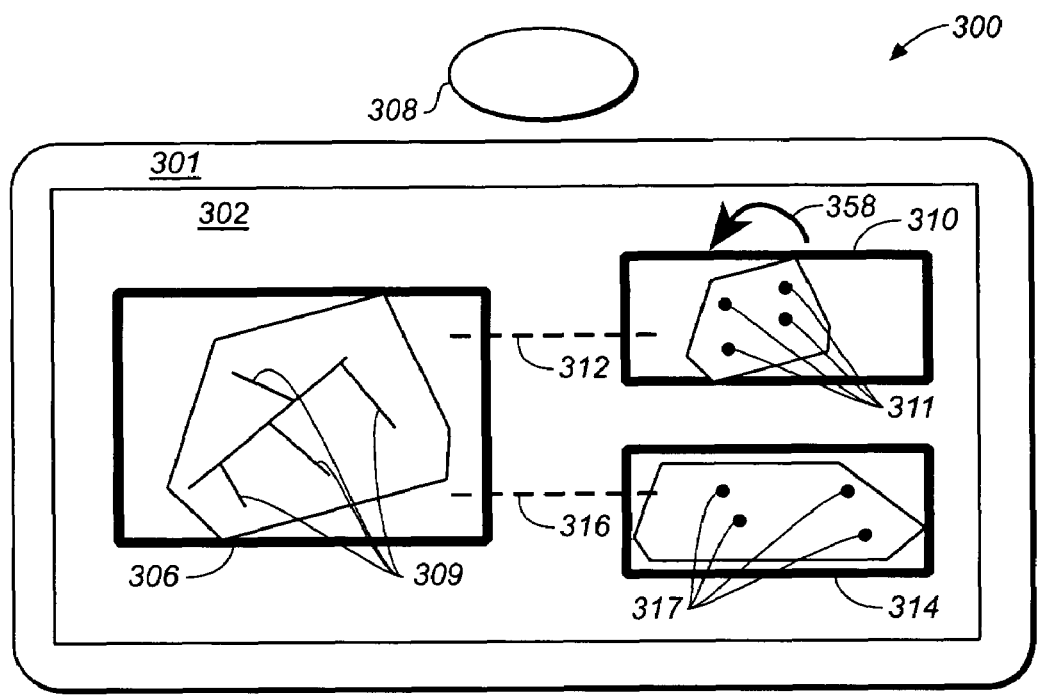
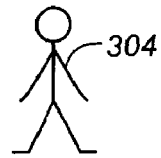
FIG._3Q
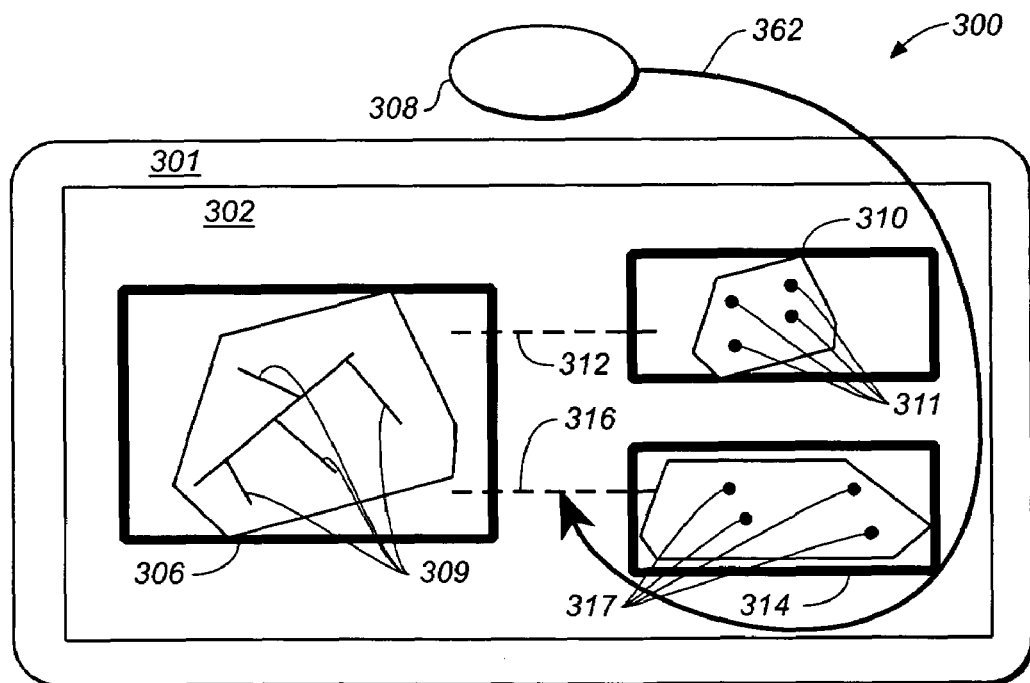
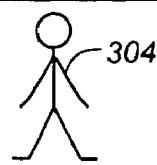
FIG._3R

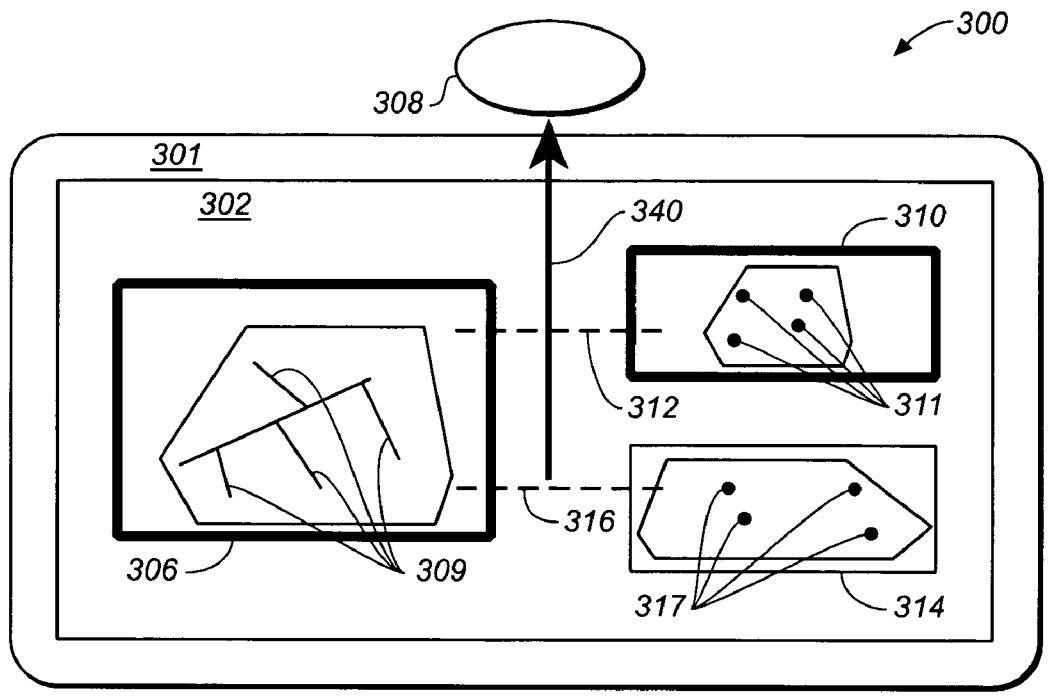
FIG._3S
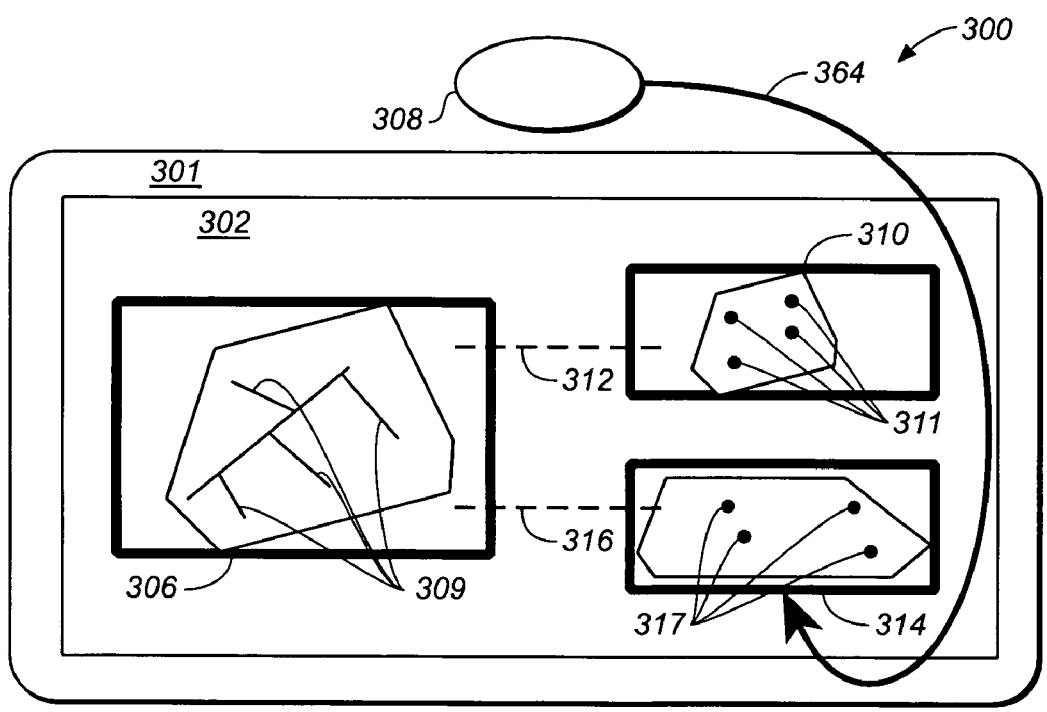
FIG._3T

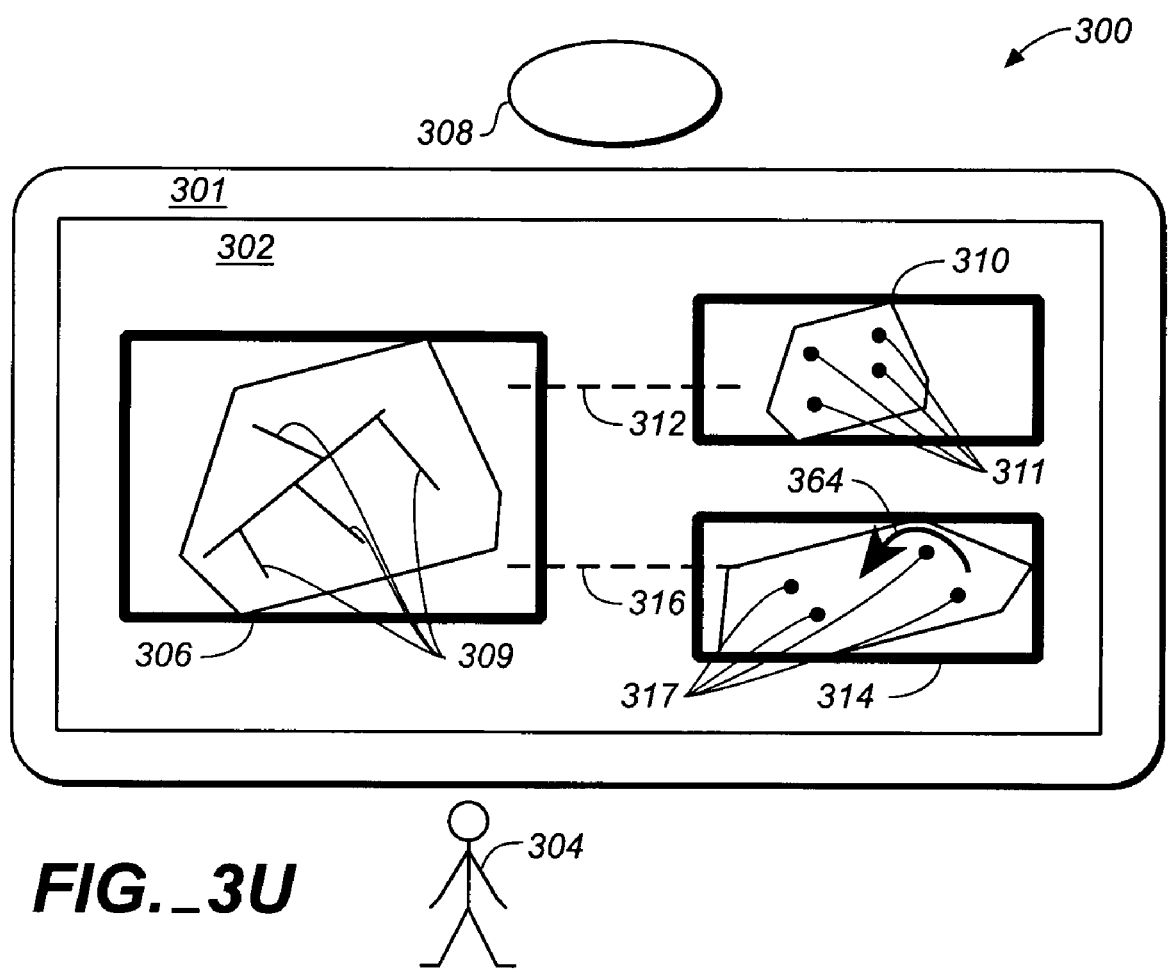
FIG._3U

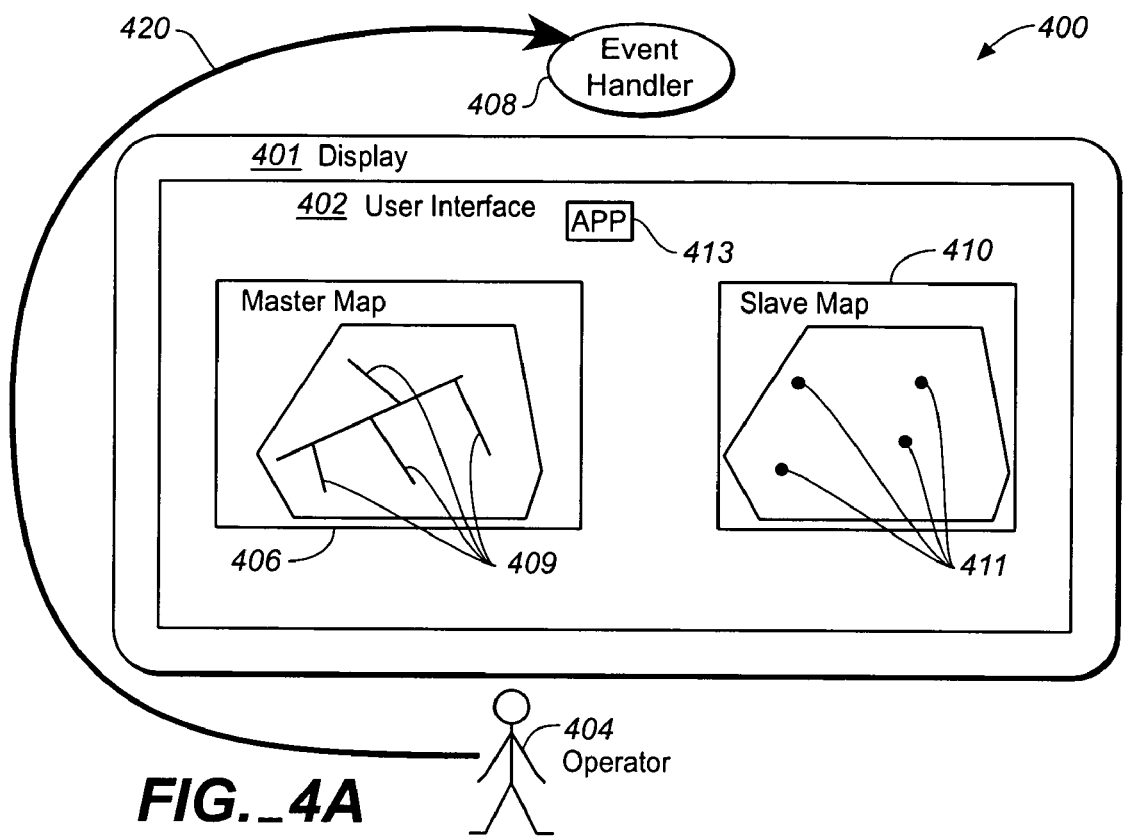
FIG._4A
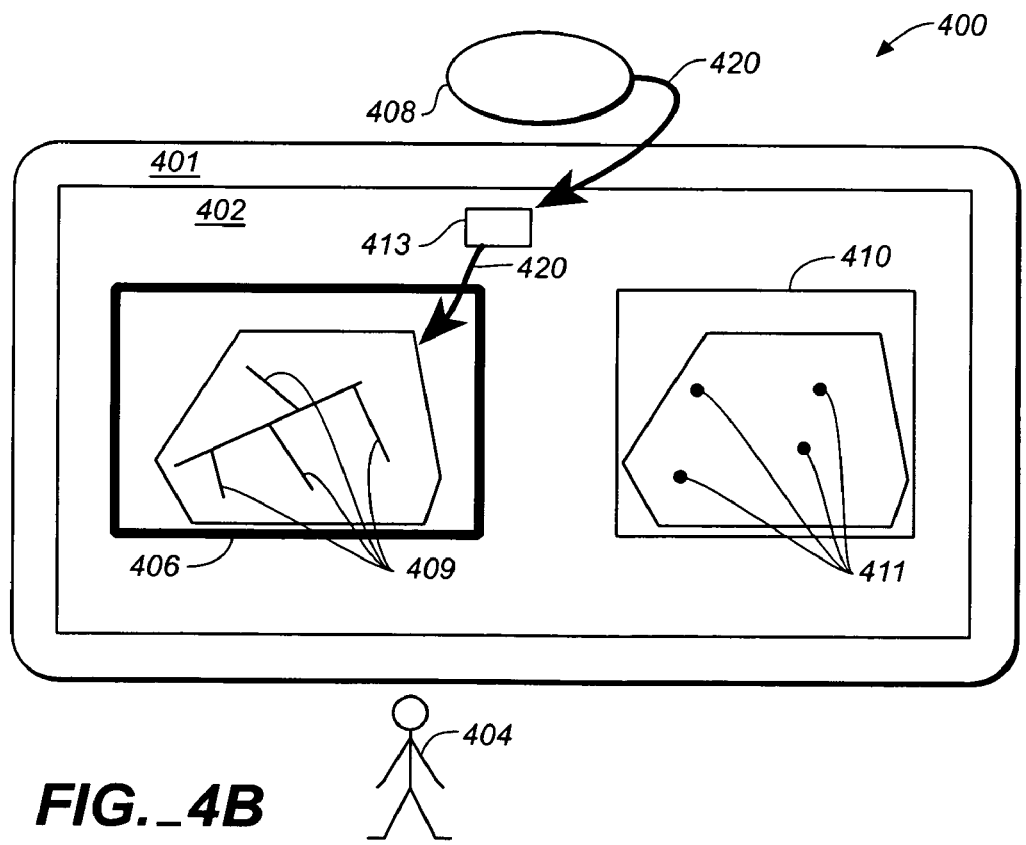
FIG._4B

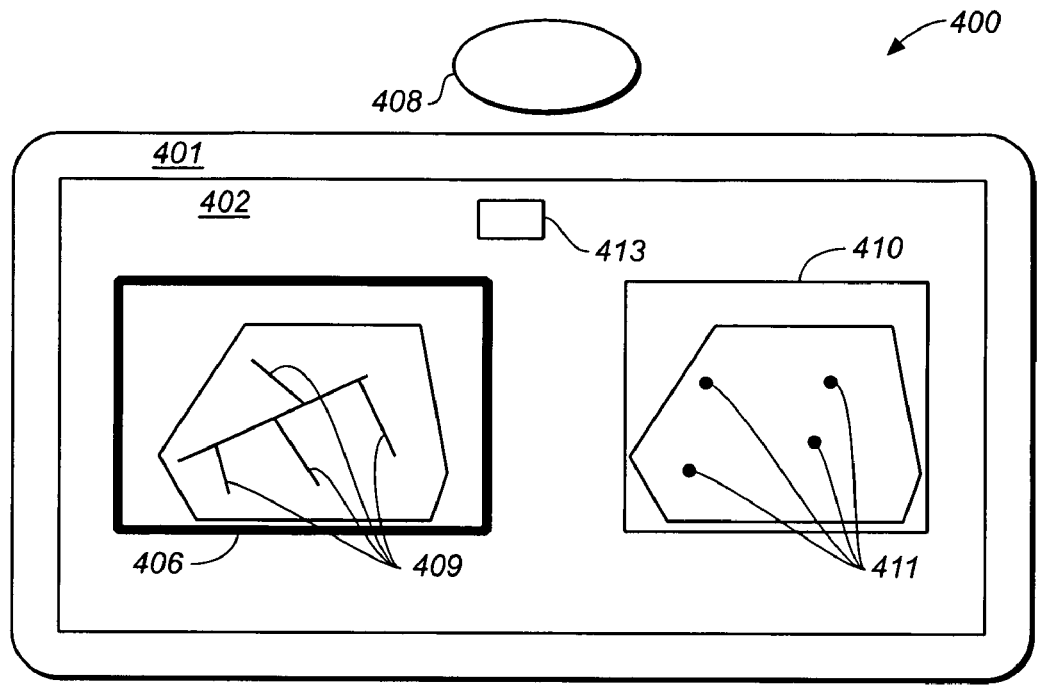
FIG._4C
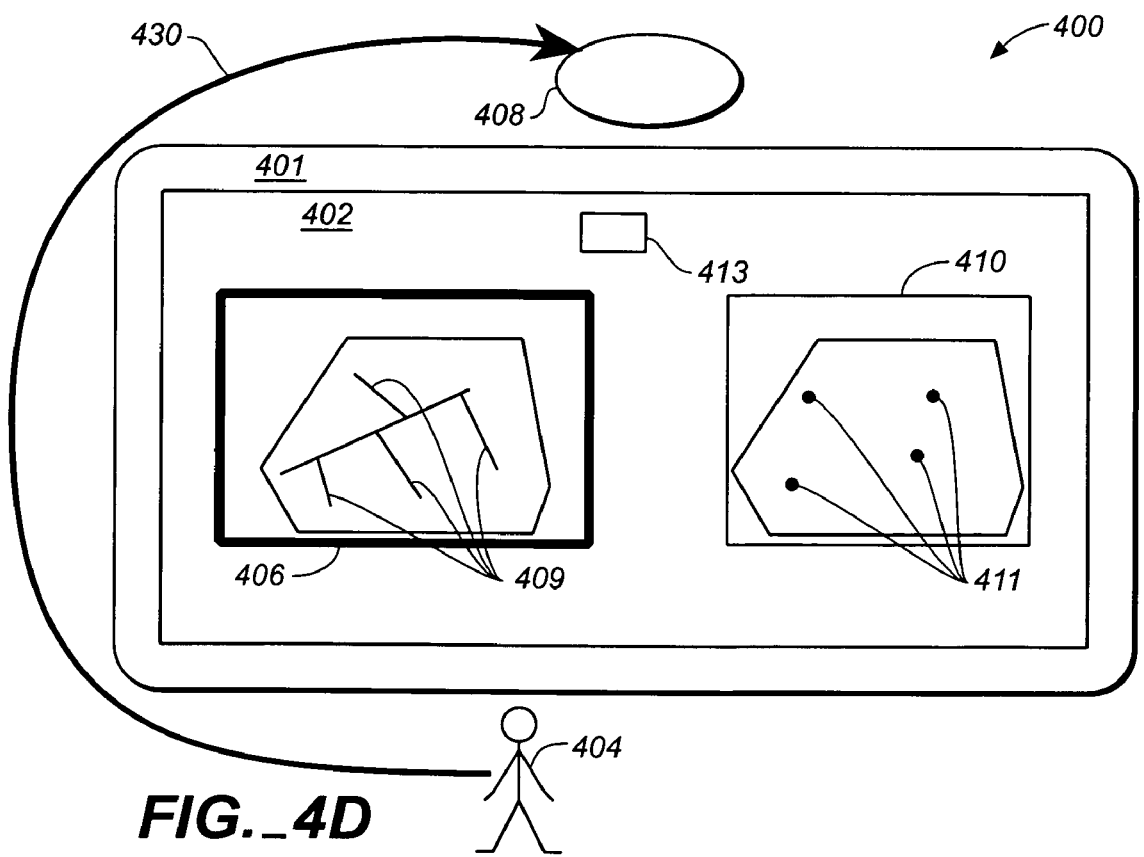
FIG._4D

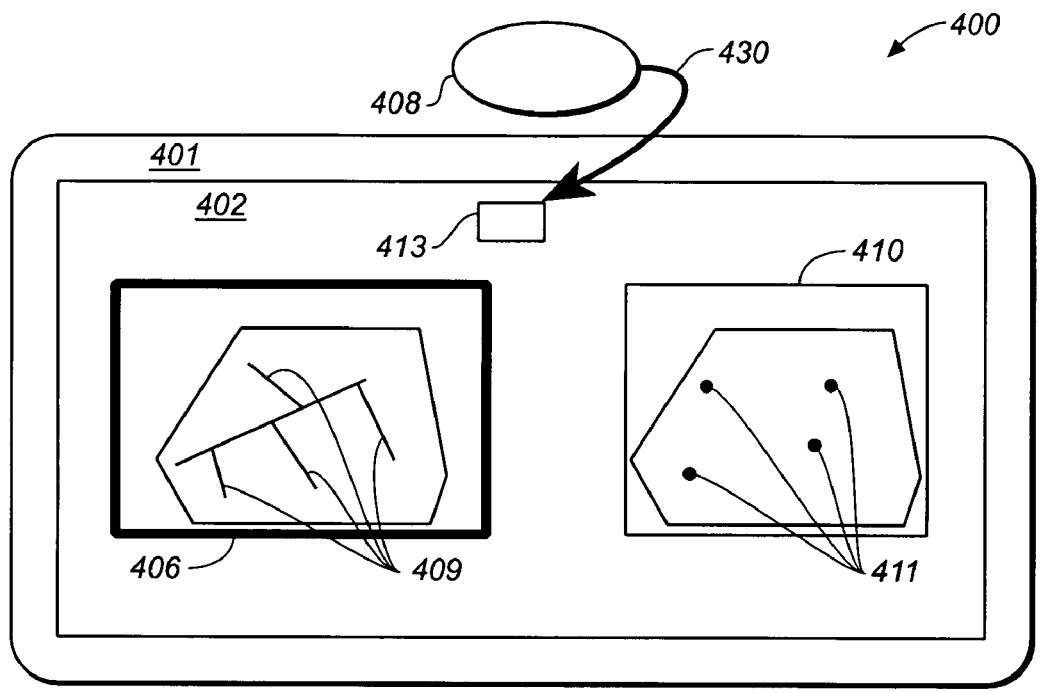
FIG._4E
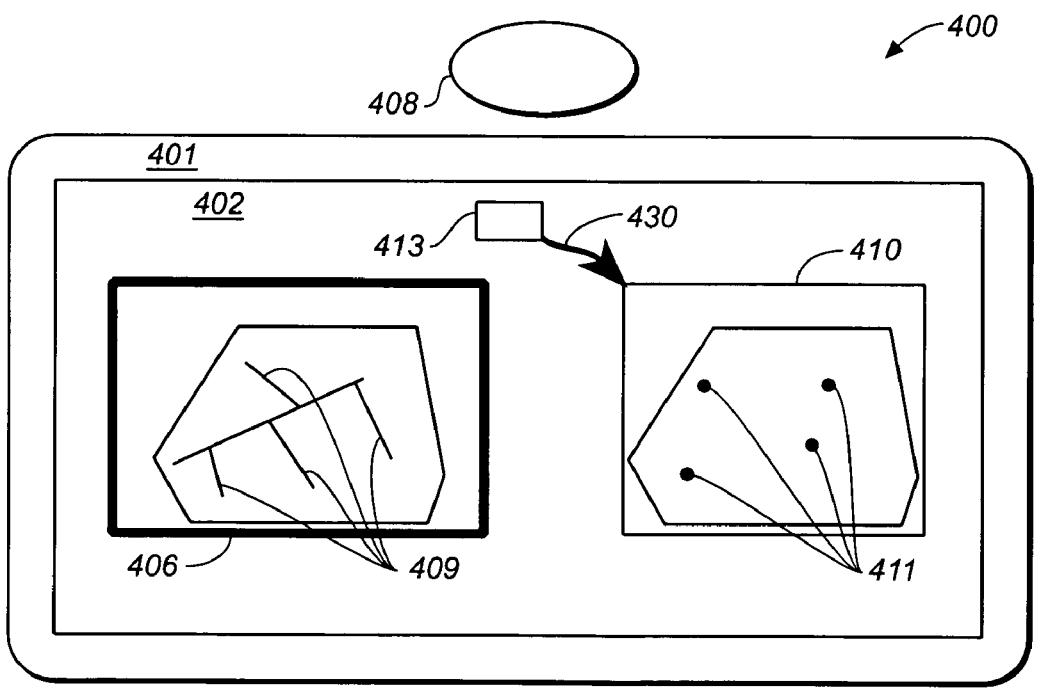
FIG._4F

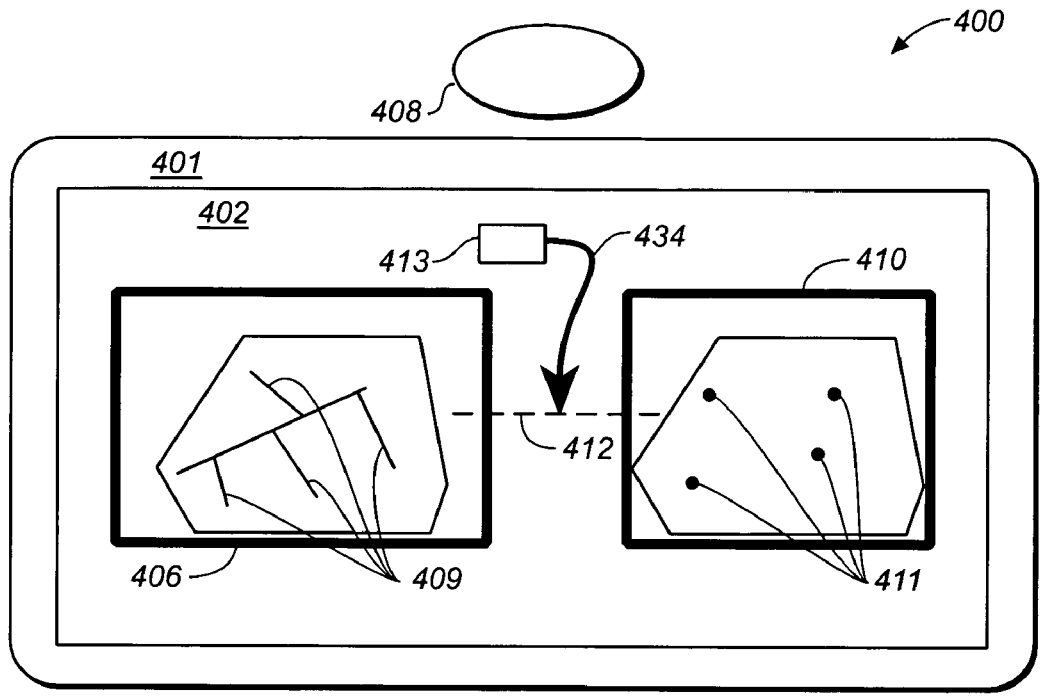
FIG._4G
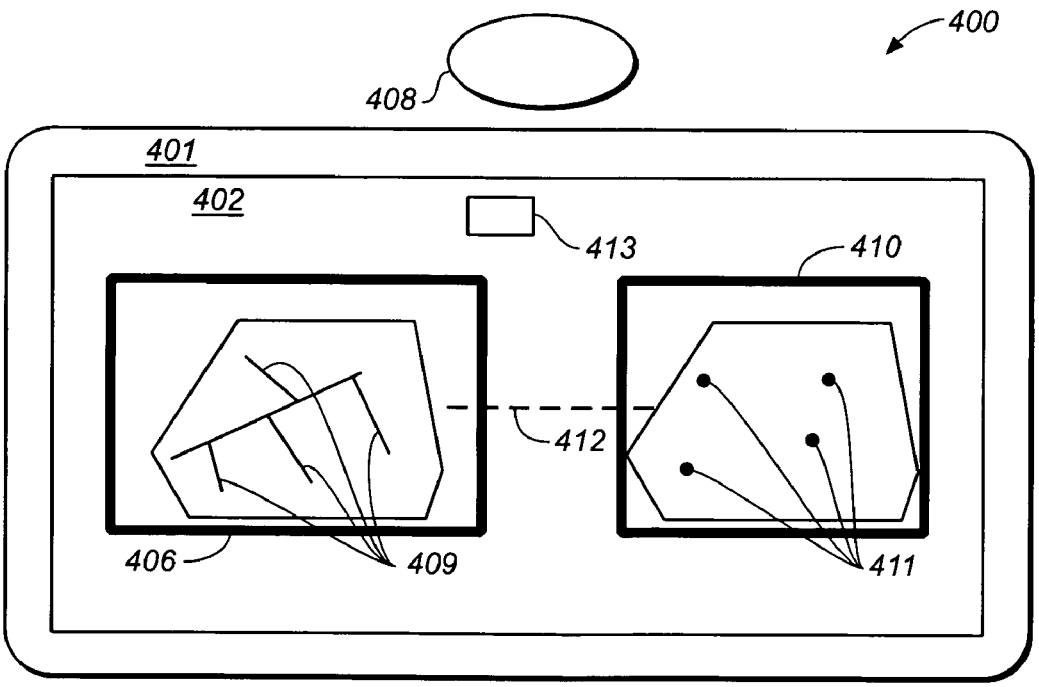
FIG._4H

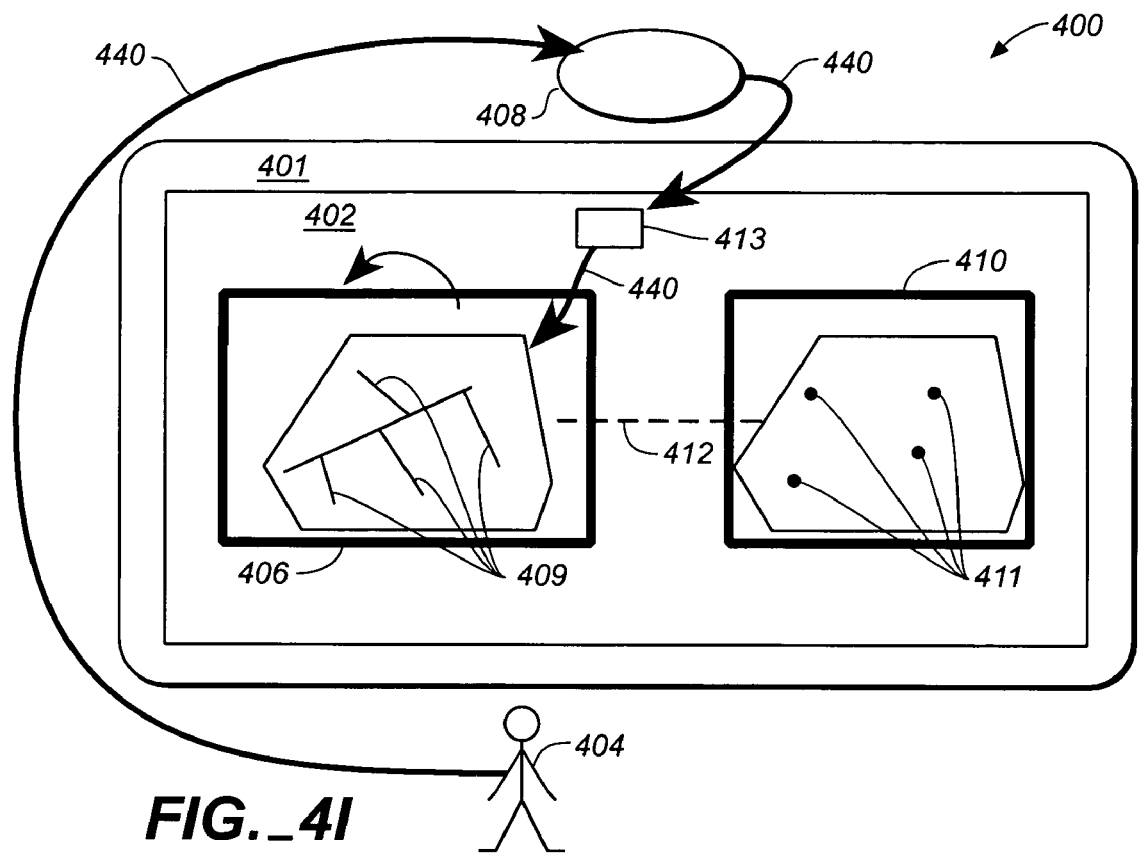
FIG._4I
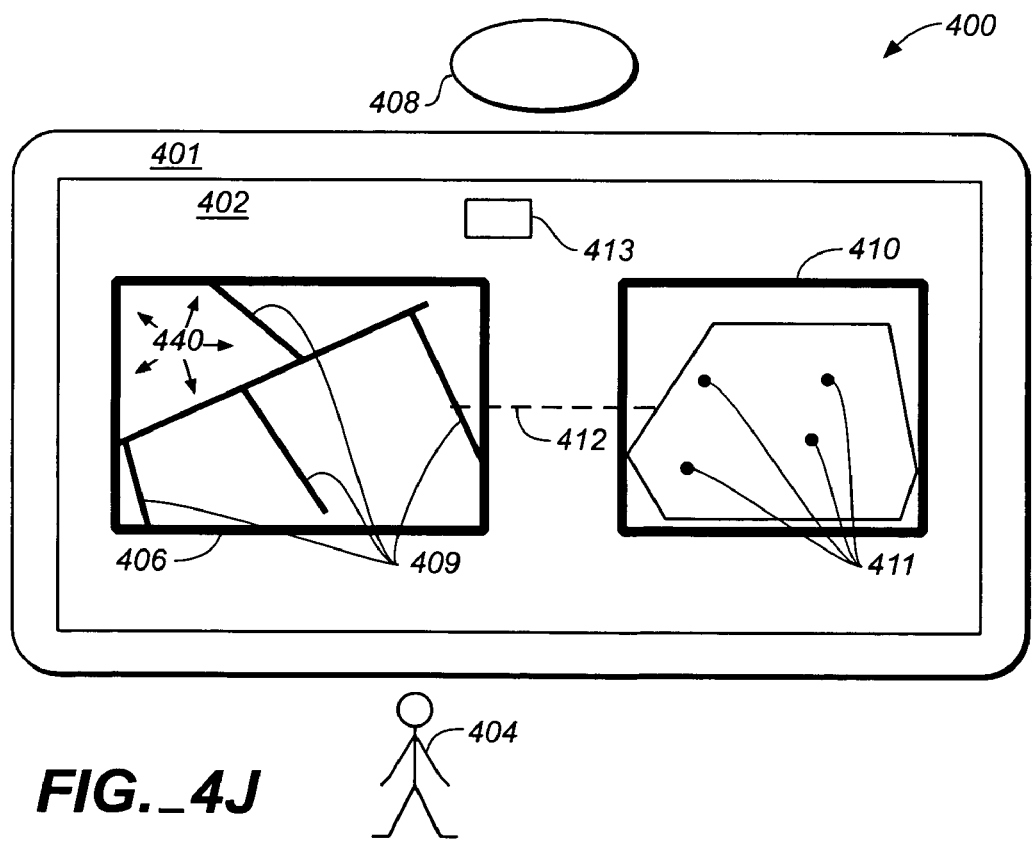
FIG._4J

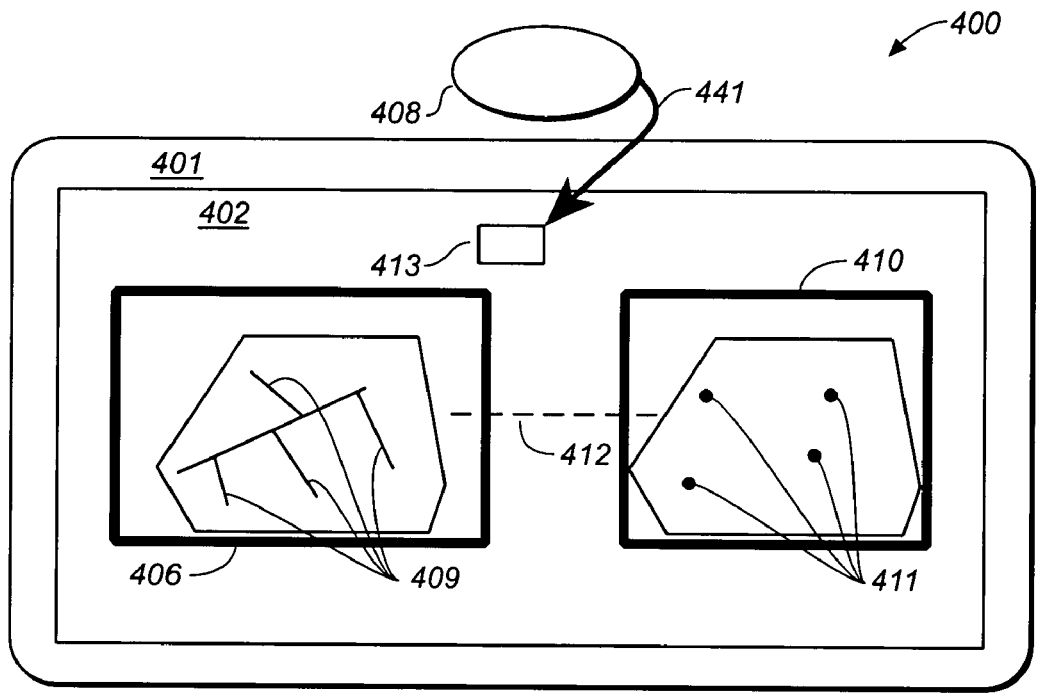
FIG._4K
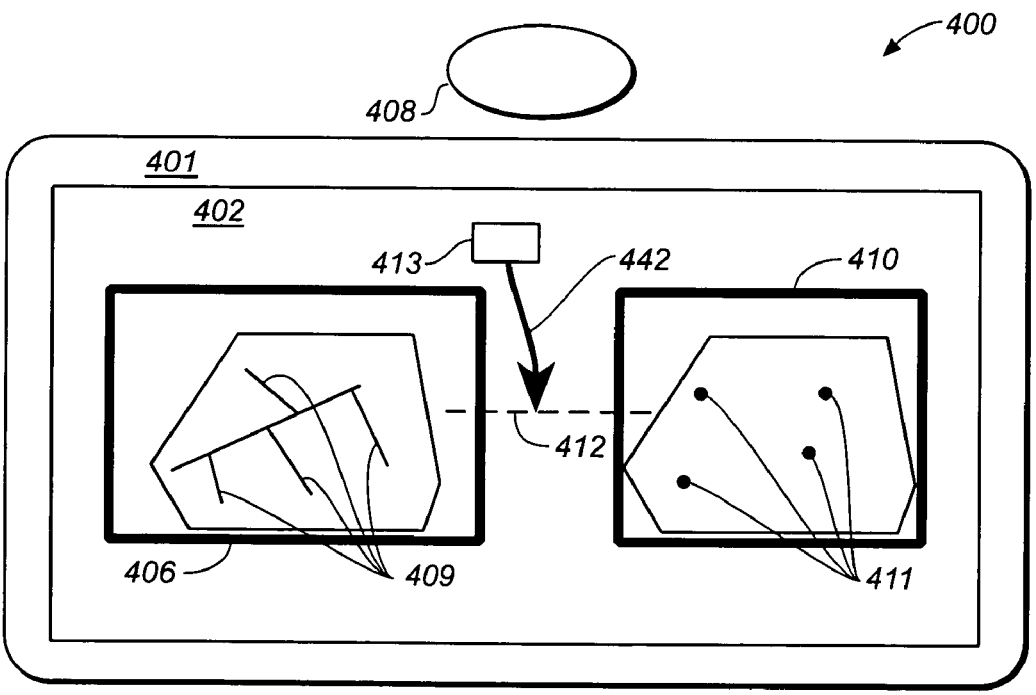
FIG._4L

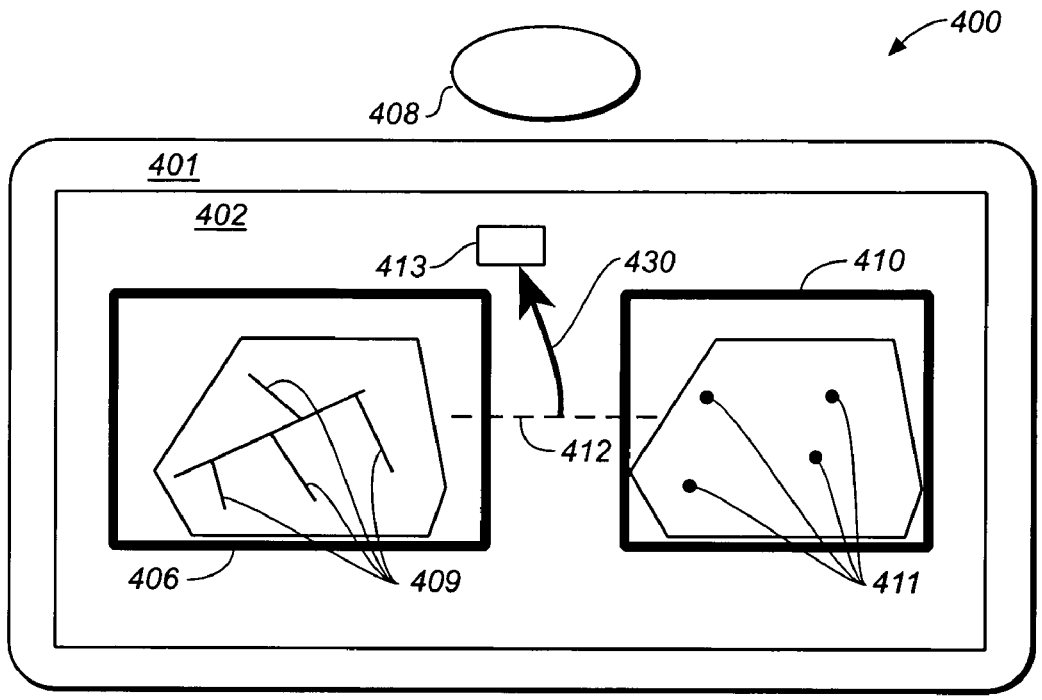
FIG._4M
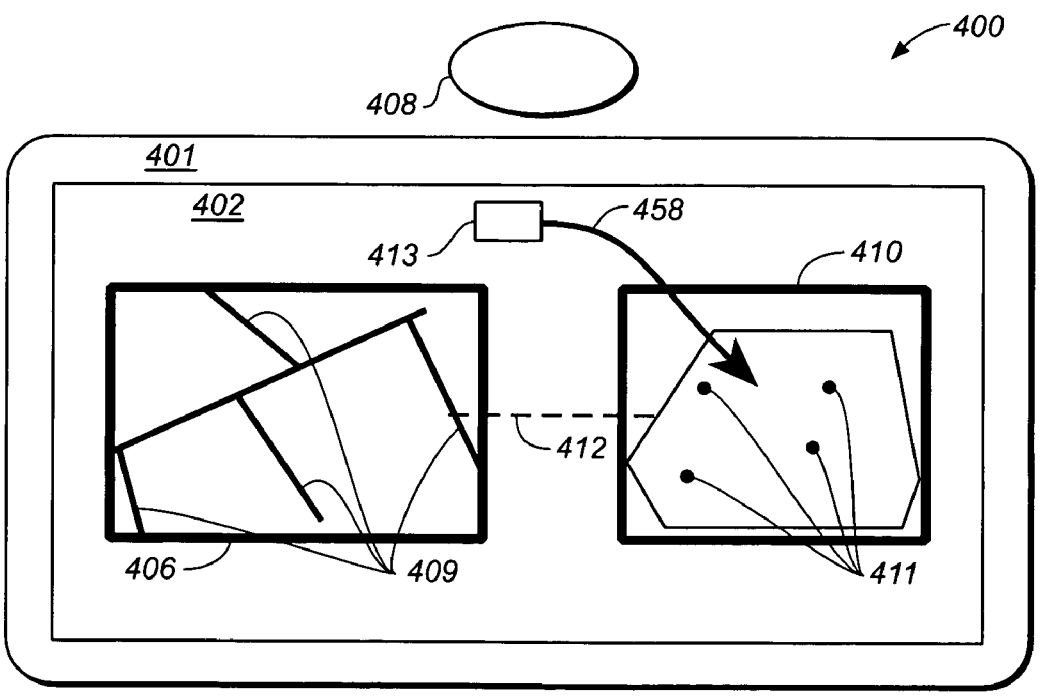
FIG._4N

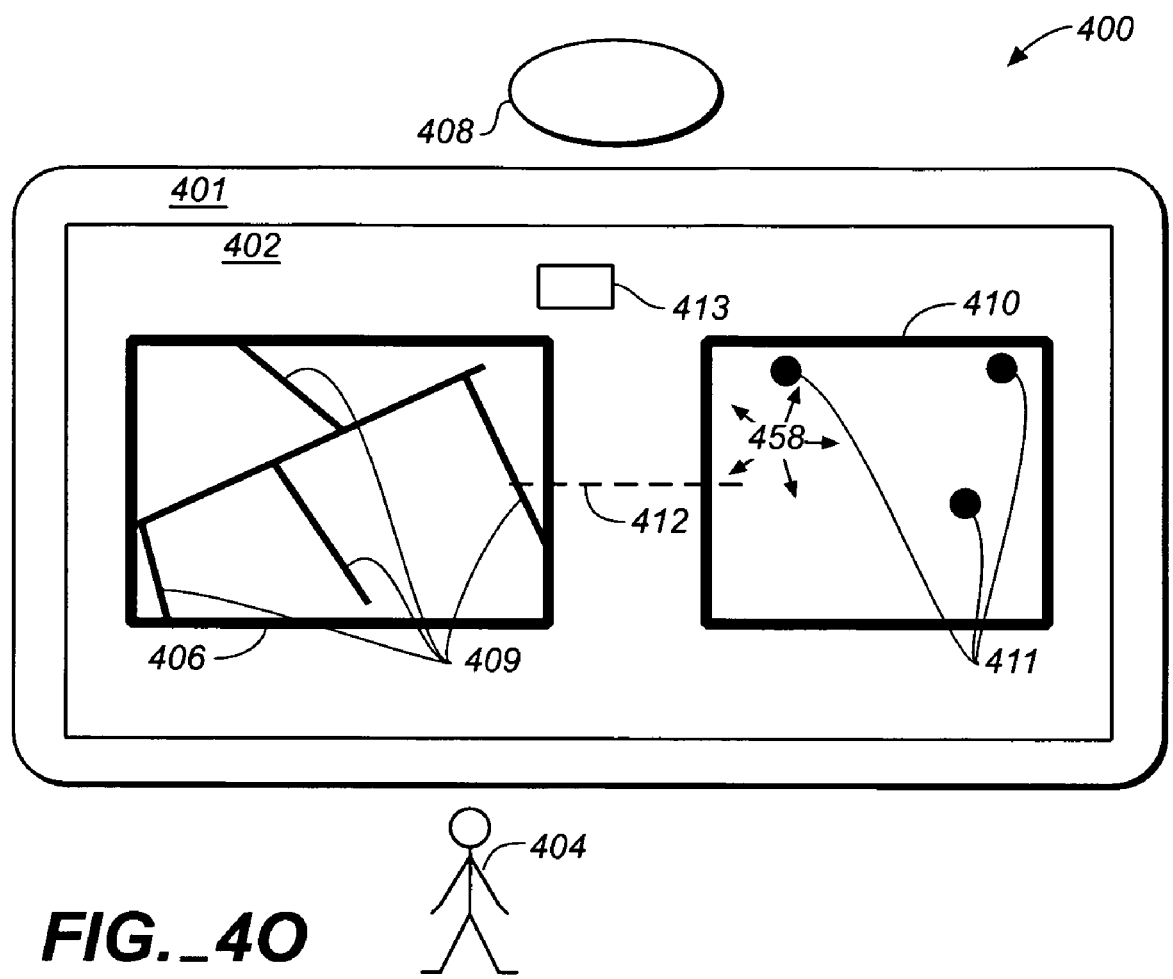
FIG._4O

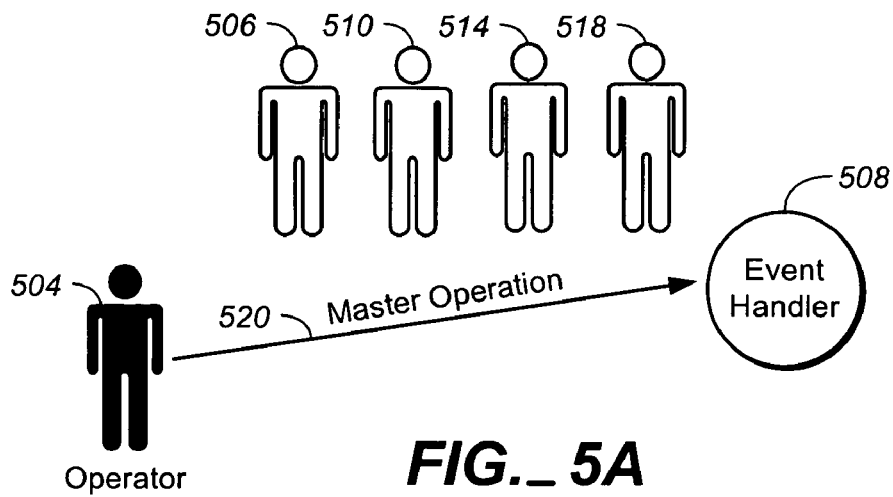
FIG._5A
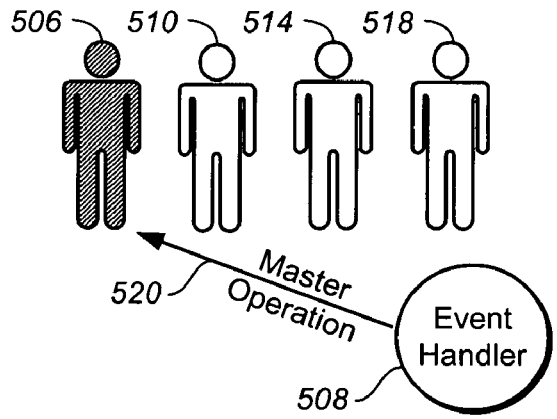
FIG._5B
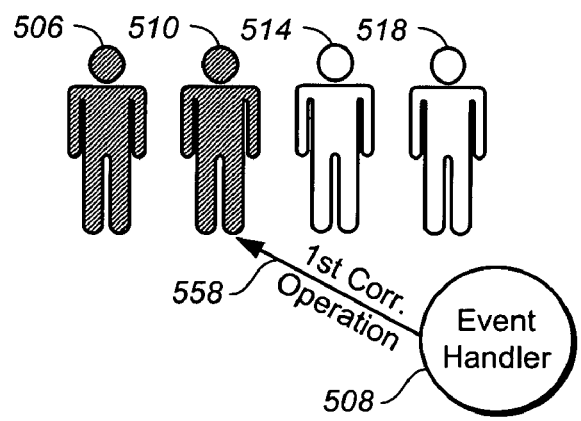
FIG._5C
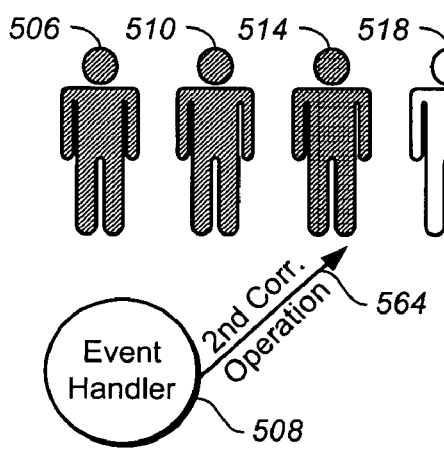
FIG._5D
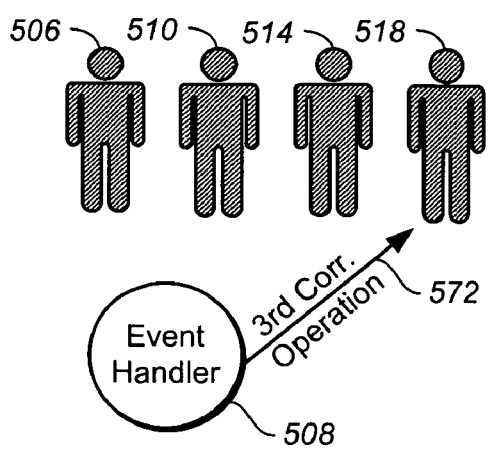
FIG._5E

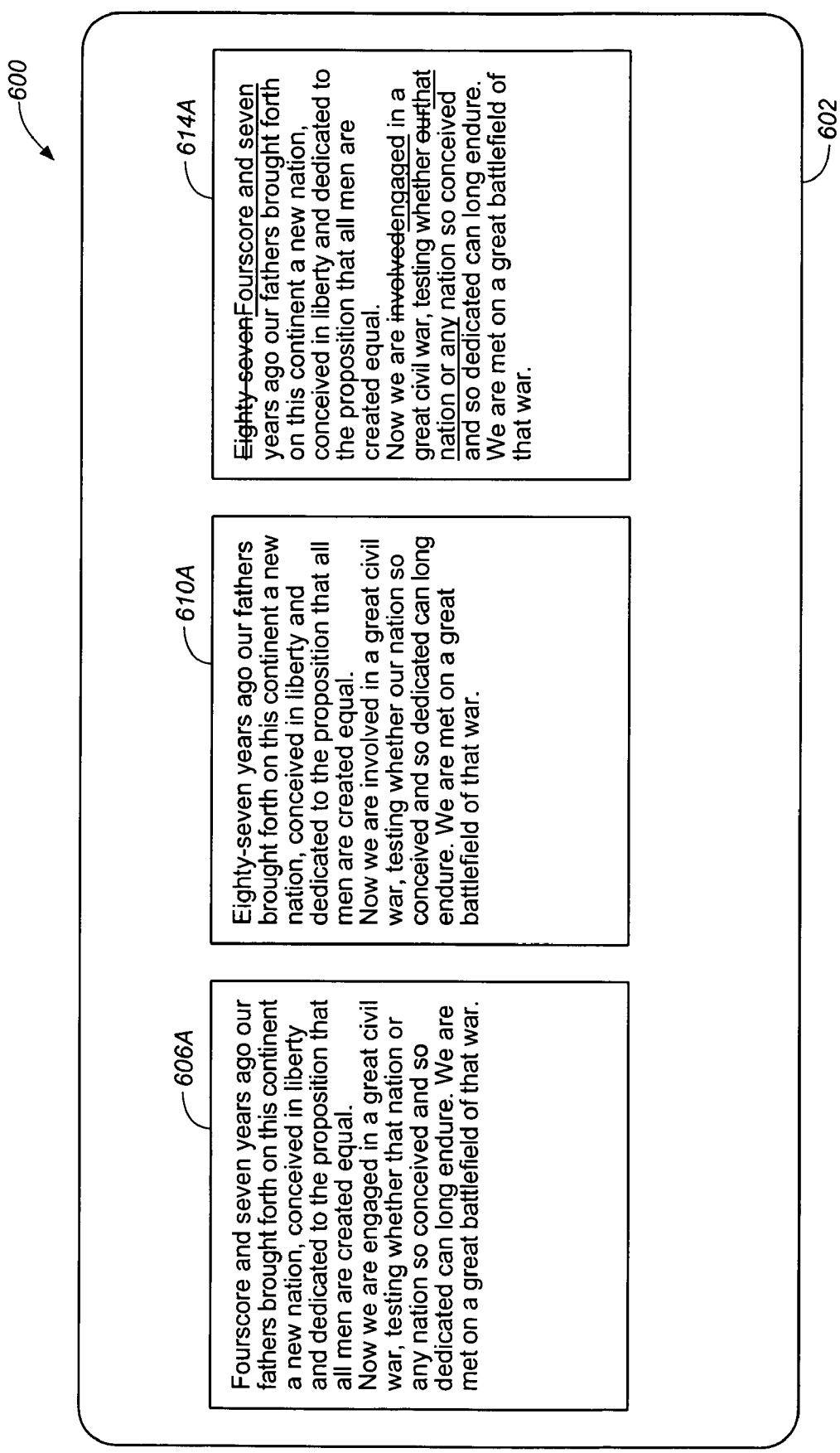
FIG._6A

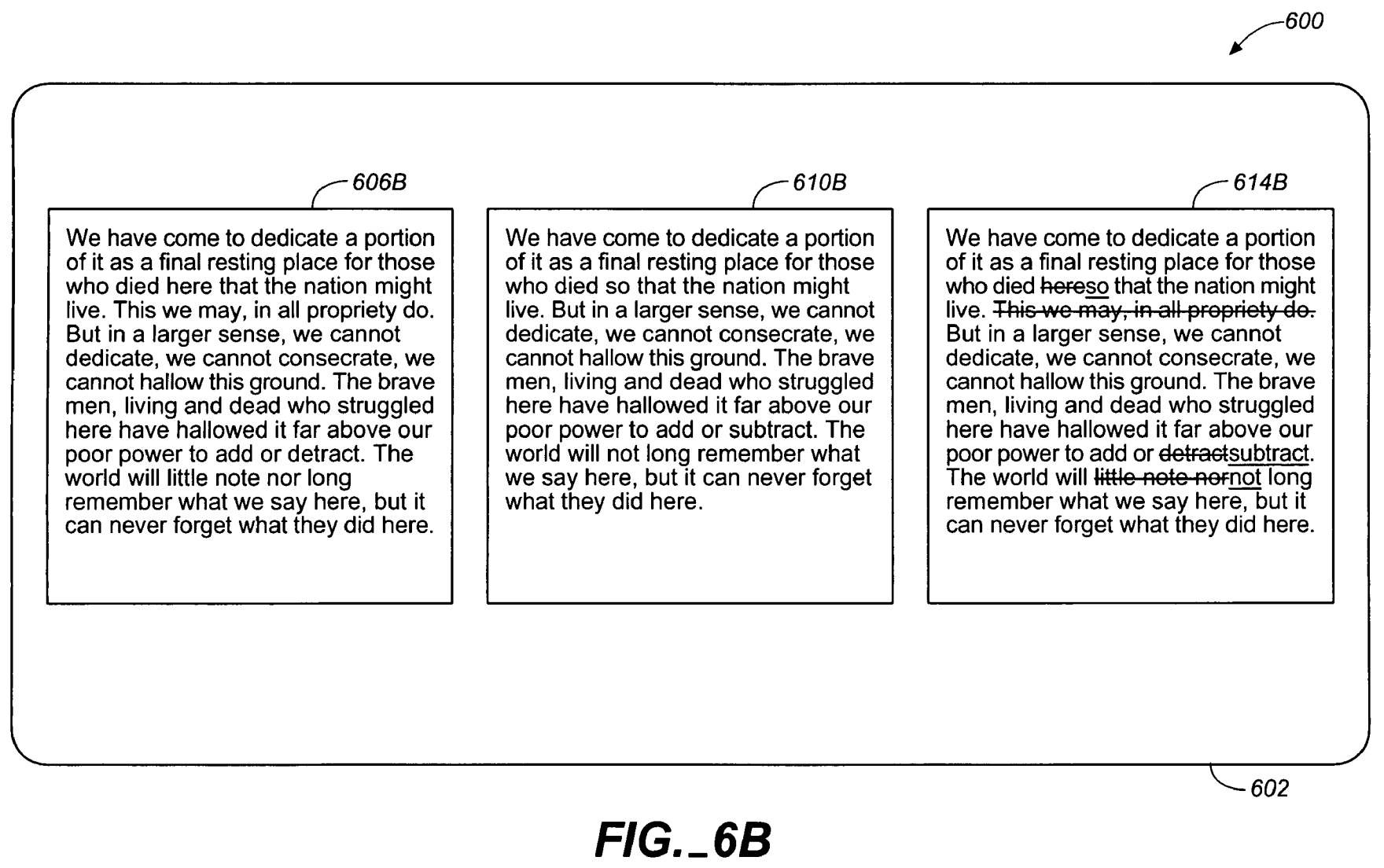

It is rather for us the living, we here be dedicated to the great task remaining before us--that from these honored dead we take increased devotion to that cause for which they here gave the last full measure of devotion--that we here highly resolve that these dead shall not have died in vain, that this nation shall have a new birth of freedom, by the people, for the people shall not perish from the earth.
November 19, 1863. Gettysburg, PA.

610C

It is for us the living to dedicate ourselves to the great task remaining before us--that from these honored dead we take increased devotion to that cause for which they here gave the last full measure of devotion--that we here highly resolve that these dead shall not have died in vain, that this nation shall have a new birth of freedom, and that government of the people, by the people, for the people shall not perish from the earth. Thank you.
November 19, 1863. Gettysburg, PA.

614C

It is ~~for us the living to dedicate ourselves~~ rather for us the living, we here be dedicated to the great task remaining before us--that from these honored dead we take increased devotion to that cause for which they here gave the last full measure of devotion--that we here highly resolve that these dead shall not have died in vain, that this nation shall have a new birth of freedom, and that government of the people, by the people, for the people shall not perish from the earth. ~~Thank you.~~
November 19, 1863. Gettysburg, PA.

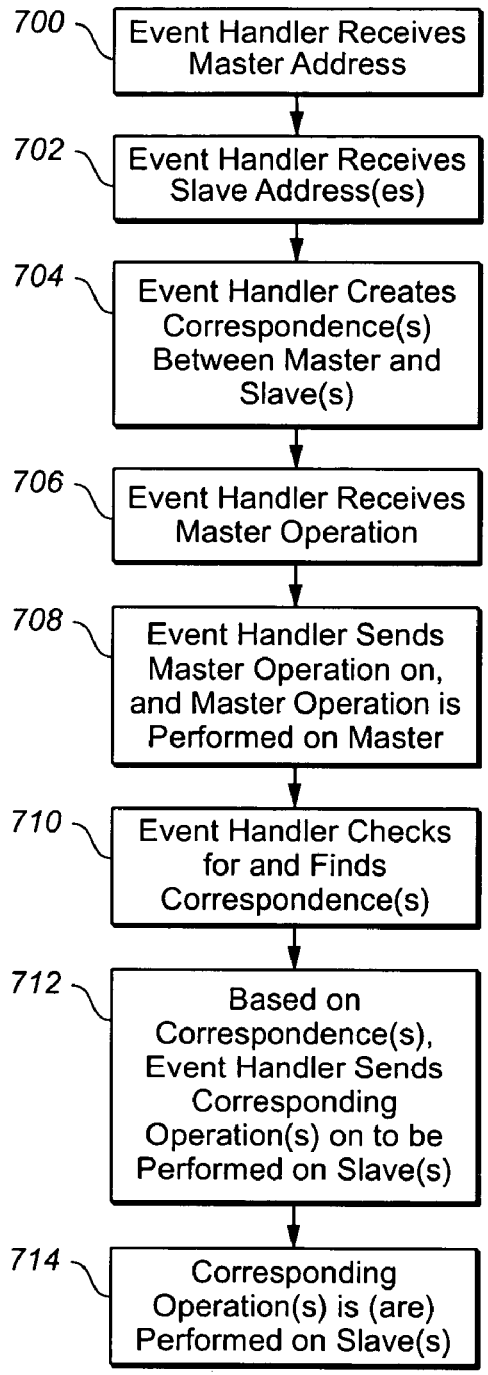
FIG._7
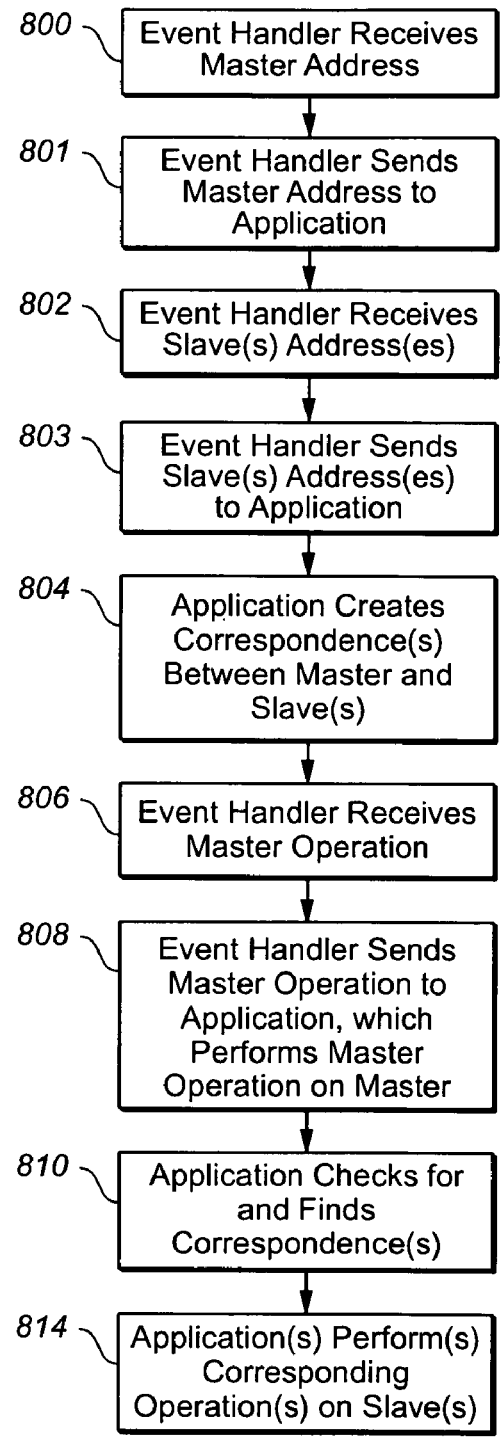
FIG._8

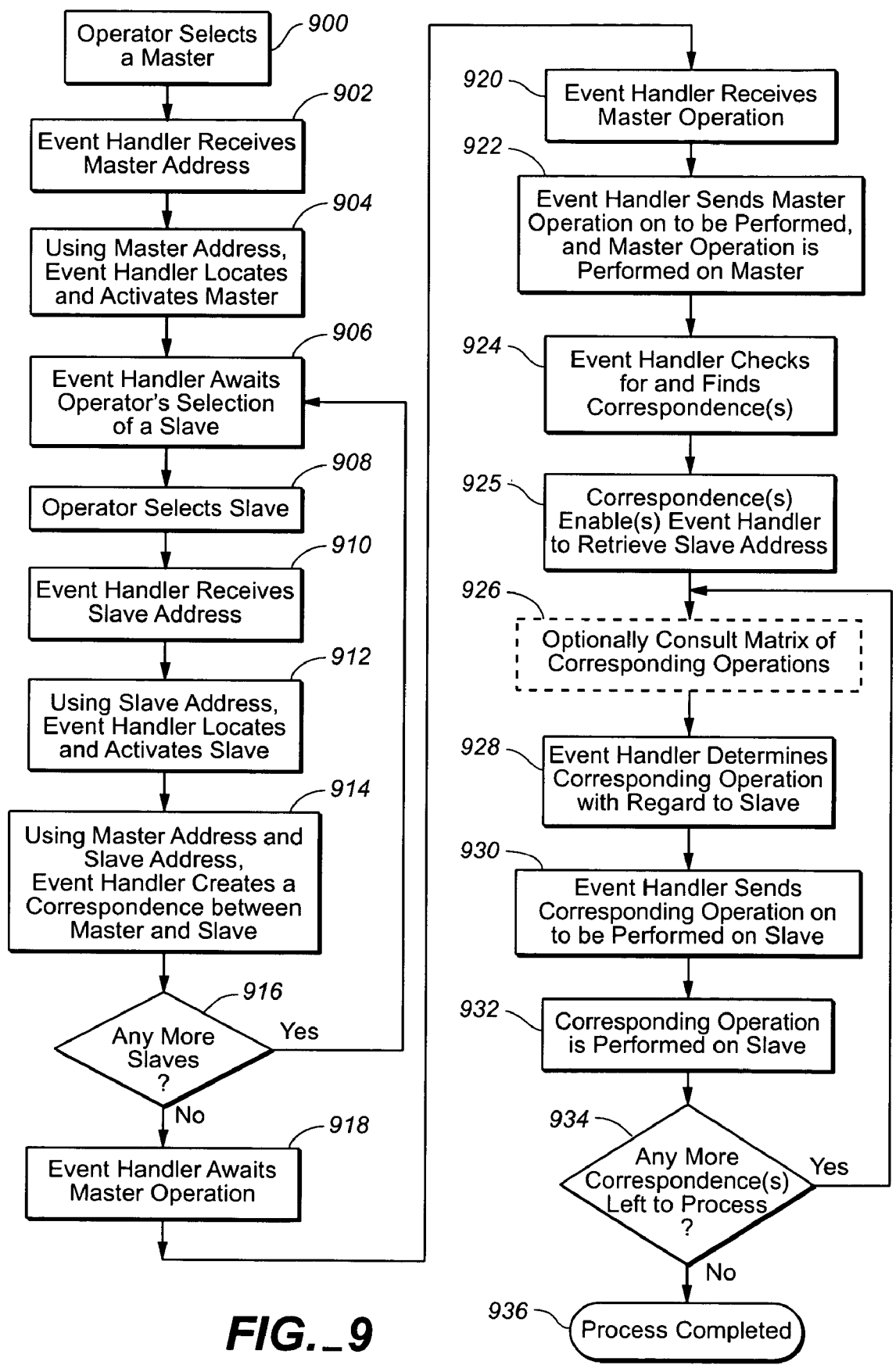
FIG._9

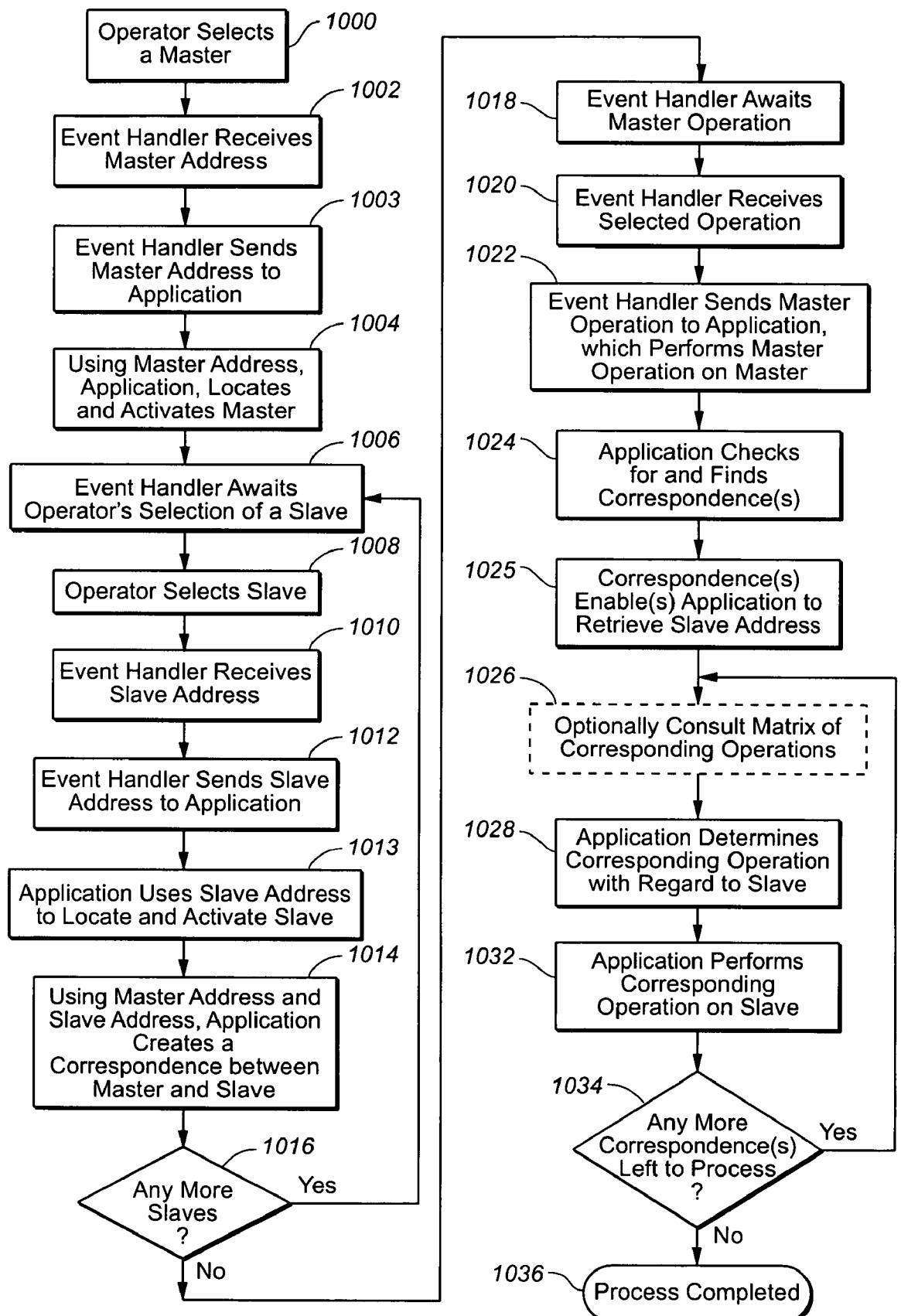
FIG._10

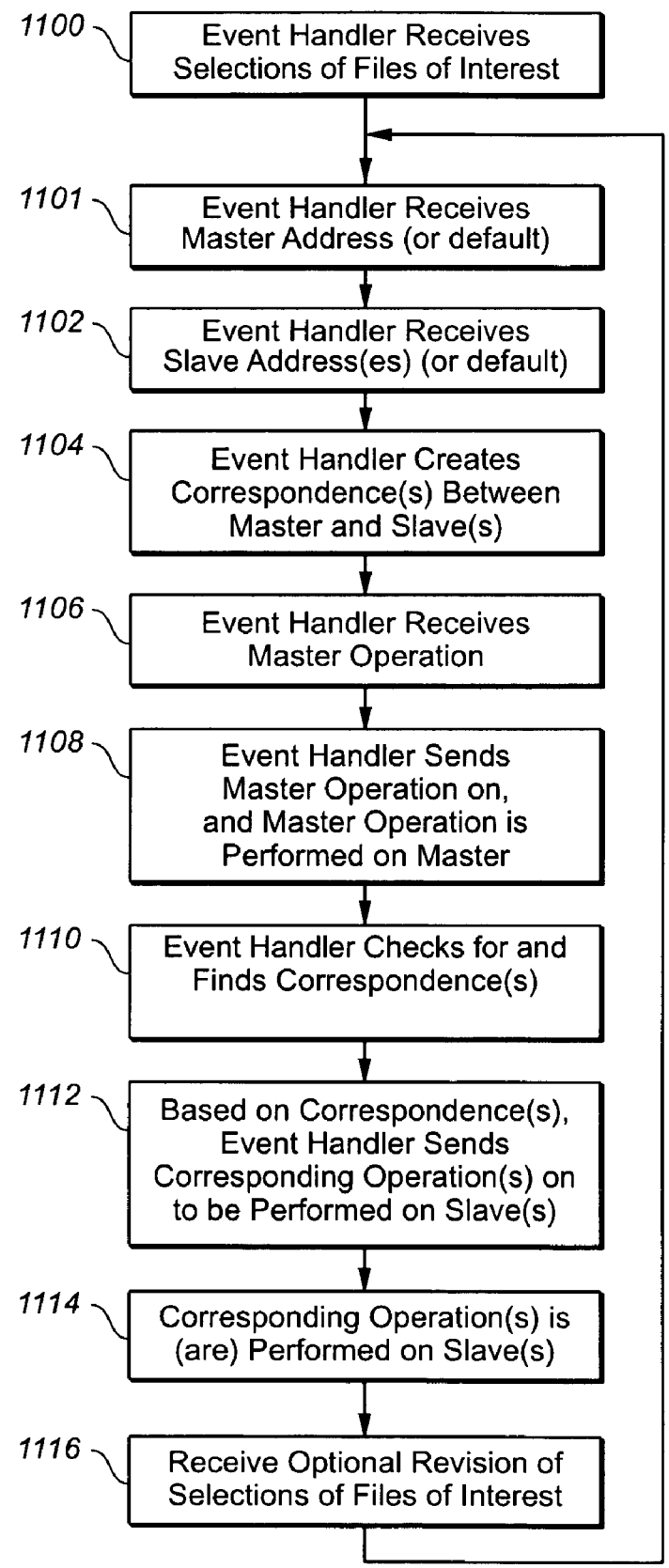
FIG._11

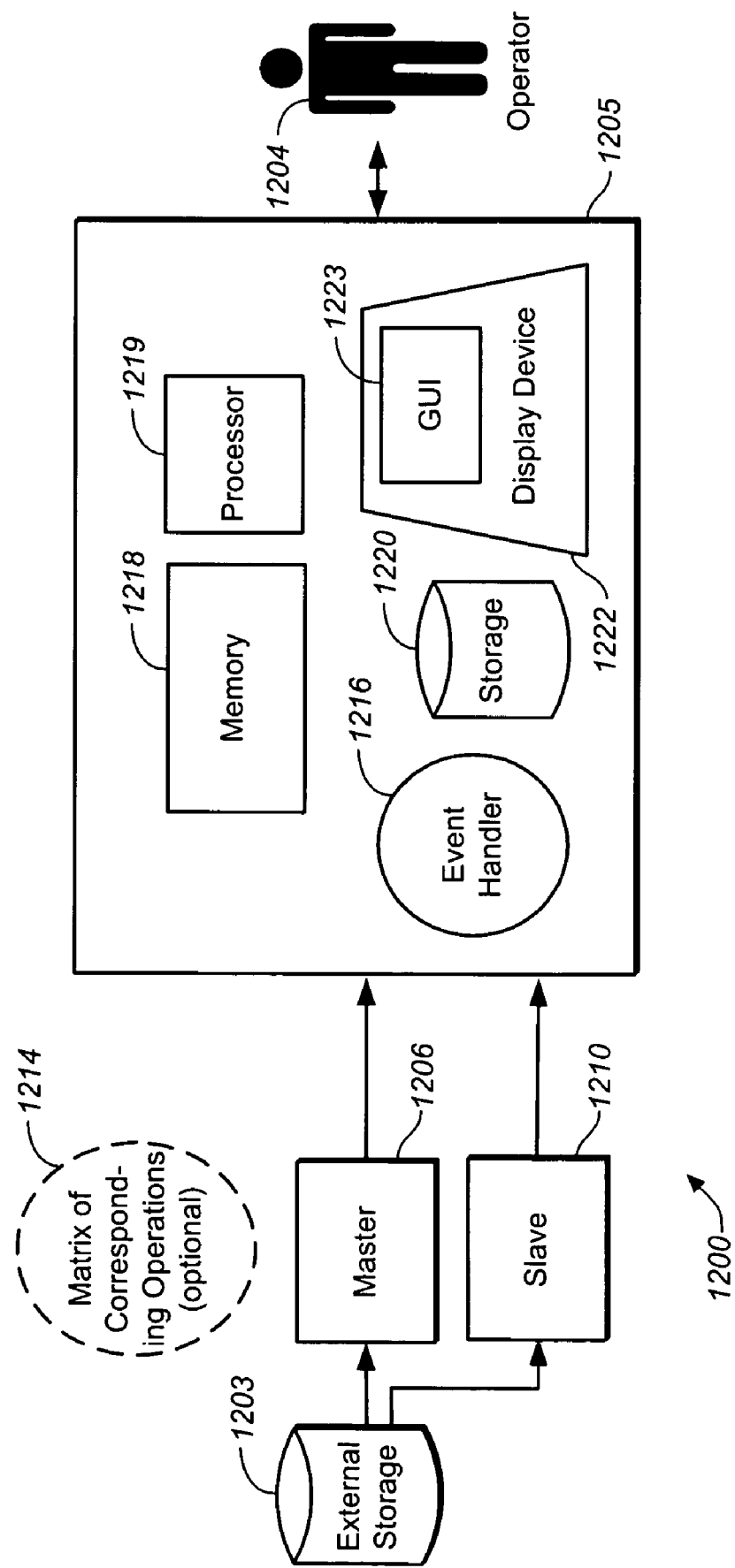
FIG._12

//SYSTEM AND METHOD FOR AUTOMATICALLY EXECUTING CORRESPONDING OPERATIONS ON MULTIPLE MAPS, WINDOWS, DOCUMENTS, AND/OR DATABASES

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

FIELD OF THE INVENTION

The invention is related to systems and methods for executing corresponding operations on sets of data, and particularly to a system and method for automatically executing corresponding operations on multiple maps, windows, multiple documents and/or databases.

BACKGROUND OF THE INVENTION

In today's modern computerized society, ever-increasing demands are being placed on existing computers, computer networks, servers, and other information processing systems. Approaches designed to maximize the use of information resources have become not only advisable but often necessary.

Often it is desirable to receive a master operation to be executed on a master set of data and then to automatically execute corresponding operations on one or more sets of data (one or more "slaves"). In one embodiment, the corresponding operations are the same as the master operation. The master operation, the corresponding operations, and the data sets are found in a variety of forms. The master operation and each of the corresponding operations can consist of a logical step in a chain of commands, a computation, a re-categorization of a data set, addition or removal or editing of an annotation, in the case of maps a geographical displacement, and countless other forms. In some embodiments, an operation will not affect the data set's permanent structure but is only an operational convenience, for example, as with a geographical rotation of a structure executed to assist in execution of a design program. As another example, in the case of electronic maps, it may be desirable to simultaneously execute a geographic displacement (which may encompass a rotation) of multiple sets of map data.

Typically, master and slave(s) are not indeterminate designations, but rather designations that vary from one particular use of the invention to the next. In some embodiments, master and slave(s) are designations that result from operations that are performed by an operator rather than from a permanent classification of a particular window/document/database.

Window-type operating systems, as used in computers and computer networks, are among the most commonly used environments for processing data. It is well known to cut and paste by "cutting" desired material from one source location or source document and "pasting" the material in a second target location or target document. It is also well known to "drag and drop" by "dragging" desired material from one source location or source document and "dropping" the material in a second target location or target document. Typically, a separate "cut and paste" operation (or, minimally, a separate "paste" operation) or a separate "drag and drop" operation must be executed for each target location or target document.

In the case of electronic maps, it is frequently desired to simultaneously make a given modification of two maps displaying different characteristics of a given geographic region. As an example, one map may show a given area's highway and road system, and another map may show the same area's restaurants.

In the case of different programs, such as two different word processing programs, or a word processing program and a spreadsheet program, it may be desired to automatically execute the corresponding operation in both programs. As one of many examples, it may be desirable to automatically execute a change of font, a change of color, or a right justification in both a word processing program and a spreadsheet program.

As one example, in comparing two similar documents in a word processing system, it would be desirable to have the ability to synchronize the first document with the second document, so that an operator who scrolls down the first document will cause a corresponding scrolling down to happen simultaneously in the second document. In the case where a third document has been generated, highlighting the differences between the first two documents, it would also be desirable to have the ability to synchronize the first document with the third document (and similarly, to synchronize the second document with the third document) so that an operator who scrolls down the first (or second) document will cause a corresponding scrolling down to happen simultaneously in the third document. It would also be desirable to synchronize together all three documents so that an operator who scrolls down any one of the three documents will cause a corresponding scrolling down to happen simultaneously in the other two documents.

SUMMARY OF THE INVENTION

Generally described, under embodiments of the invention, the invention receives a master operation that is executed by an operator on a master window, a master document, or a master database, and causes corresponding operations to be automatically executed on one or more slaves, which can each be a window, a document, or a database.

In the case of documents, embodiments of the invention can operate with master and slave documents that are initially either open or closed or both, depending on the operator's desires and the current state of the computing device. If necessary, embodiments of the invention are capable of opening documents that are closed. Nevertheless, the invention works similarly on maps, windows, documents, and databases. The computer architecture comprises an event handler that could be generally programmed by one of skill in the art and is responsible for causing needed or requested operations to be automatically executed according to an appropriate protocol.

In some embodiments, the event handler capable of receiving selections of master and slave is part of the operating system, and, in other embodiments, it is separate from the operating system. Where the event handler capable of receiving selections of master and slave is part of the operating system, the event handler directly causes other segments of the operating system to execute the master operation on the master and to execute the corresponding operations on the slave(s). The event handler locates all slaves and relays to each of them a message directing that an operation be executed on each of them that corresponds to the operation executed on the master.

In some embodiments, the corresponding operation to be executed on a slave may be identical to the operation executed on the master. This is likely to be true where the master and slave are both operating in the same application, and may be true as well where the master and slave are documents that operate in different applications. In other embodiments, that will not be true and for one or more of the slave(s), the corresponding operation will be different from the operation executed on the master. In one embodiment, the system includes a matrix of corresponding operations that is consulted by the event handler to determine—for each of the one or more slave documents—which operation corresponds to the operation executed on the master document. There is not necessarily any relationship between different matrix elements. A matrix of corresponding operations for an application involving N windows/documents/databases will be of dimension $N^2$. Where the corresponding operation is the same in all cases as the master operation, the matrix of corresponding operations is an identity matrix.

All embodiments operate with one master and with one or more slave(s). It should be understood that master and slave are not necessarily permanent or even semi-permanent designations. Master and slave are designations that may only last for the duration of a particular use of the invention. A map, window, document, or database that is the master in one use of the invention could be the slave in the next use of the invention. Similarly, a map, window, document, or database that is the slave in one use of the invention could be the master in the next use of the invention. Moreover, although there is only one master for a given use of the invention, any number of slave(s) may be present. For simplicity, in some diagrams, we have limited ourselves to one slave, but this is purely for convenience only and does not reflect any limitation of the invention to one slave. One or more slave(s) are possible for a given embodiment.

Various embodiments include, as examples, methods for selecting the master, such as executing a master operation on the master, operator input designating the master, selecting a "corresponding operations-multiple maps/windows/documents/databases" command that initiates the functioning of the invention and then selecting the master, by pre-selecting the master as a default master, and by pre-selecting the master as a default master and opening the master. Other methods for selecting the master can be programmed by those skilled in the art. Various embodiments include, as examples, methods for selecting the slave(s), such as (1) operator input designating the slave(s); (2) selecting a "corresponding operations-multiple maps/windows/documents/databases" command and then selecting the slave(s); (3) pre-selecting the one or more slaves as one or more default slaves; and, (4) by pre-selecting the one or more slaves as the one or more default slaves and opening the master. The selection of the slave(s) can be considered as simultaneously creating a connection between the master and each of the slave(s). Other methods for making the selections of the slave(s) will be evident to those skilled in the art. Moreover, various embodiments will incorporate the event handler function as part of the operating system, as a separate routine incorporated into other software, as a stand-alone routine, or in other forms. Other embodiments incorporating the event handler function into the system can be programmed by those skilled in the art.

In certain embodiments, the master and/or one or more slaves and/or the master operation will be selected by default. In certain embodiments, the operator selects the one or more slaves by creating a correspondence between the master and each of the one or more slaves.

In one embodiment of the invention, the master and slaves are similar documents (as with different "drafts" of the same document) created in a word processing program. According to this embodiment of the invention, a group of documents is selected prior to operation of the invention. In this example, the group comprises three documents, but any number is possible. According to the invention, all documents are synchronized together so that an operator who scrolls down any one of the documents will cause a corresponding scrolling down to happen simultaneously in the other documents. Moreover, every time an operator scrolls down one of the documents, that document becomes the new master document.

In one embodiment of the invention, the master and the one or more slave document(s) are photographs. A master operation that is executed on a given photograph can be automatically executed on other photographs.

In some embodiments of the invention, a master window and/or the slave window(s) display electronic maps. The different windows may display different views of the same map or views of different maps (or, trivially, the same views of the same map). The invention functions identically regardless of whether the maps depicted in the various windows are the same or not.

BRIEF DESCRIPTION OF THE DRAWINGS

FIG. 1 is an illustration that shows how an operator, using an embodiment of the invention, can execute a master operation in a master window or on a master document or a master database and thereby cause a corresponding operation to be automatically executed on a slave without having to separately execute the respective operations on each slave.

FIGS. 2A-2D are a series of illustrations that show a more specific example of how an operator, using an embodiment of the invention, can cause an operation executed on one map/document/window/database to be automatically executed on a second map/document/window/database.

FIGS. 3A-3U are a series of illustrations that illustrate in more detail how the system operates in an embodiment in which the event handler capable of receiving selections of master and slave is part of the operating system, and in which the operator selects two slave windows, selecting each by creating a correspondence between a master window and a slave window.

FIGS. 4A-4M are a series of illustrations that illustrate in more detail how the system operates in an embodiment in which the event handler capable of receiving selections of master and slave is not part of the operating system, and in which the operator selects a slave document by creating a correspondence between a master document and a slave document.

FIGS. 5A-5E are a series of illustrations of one embodiment of the invention in which the event handler capable of receiving selections of master and slave is part of the operating system, and in which the master document and the one or more slave document(s) are photographs.

FIGS. 6A-6C are a series of screenshots of one embodiment of the invention involving three similar word processing documents, in which scrolling down by an operator through any one of the three documents will cause a corresponding scrolling down to happen simultaneously in one or both of the other two documents.

FIG. 7 is a flow chart that illustrates a summary of the typical flow of a process in accordance with the invention in an embodiment in which the event handler capable of receiving selections of master and slave is part of the operating system.

FIG. 8 is a flow chart that illustrates a summary of the typical flow of a process in accordance with the invention in an embodiment in which the event handler capable of receiving selections of master and slave is not part of the operating system.

FIG. 9 is a flow chart that illustrates in more detail the typical flow of a process in accordance with the invention in an embodiment in which the event handler capable of receiving selections of master and slave is part of the operating system.

FIG. 10 is a flow chart that illustrates in more detail the typical flow of a process in accordance with the invention in an embodiment in which the event handler capable of receiving selections of master and slave is not part of the operating system. As an example, only one slave is illustrated in the figure. Any number of slave(s) equal to or greater than one is possible.

FIG. 11 is a flow chart that illustrates a simplified summary of the typical flow of a process in accordance with an embodiment of the invention, according to which the invention permits changes in both master and slave during operation of the invention.

FIG. 12 is a block diagram that schematically illustrates, as an example, a system that can be used with an embodiment of the invention, including an optional matrix of corresponding operations, according to the below description.

DETAILED DESCRIPTION

Generally described, embodiments of the invention are capable of causing a master operation that is executed in a master window or on a master map, master document or master database to also be automatically executed in its corresponding form, respectively, in one or more slave windows and/or on one or more slave maps, slave documents or slave databases.

Generally speaking, windows must be open in order to exist, though they may be minimized, whereas documents and databases may be open or closed. Again, in general, documents and databases may be stored in any one of a number of permanent storage media, whereas windows only exist during the time the operator has them on the screen, either in maximized or minimized form. In the case of documents and databases, embodiments of the invention can operate with master and slave(s) that are initially either open or closed or both, depending on the operator's desires and the current state of the computing device. If necessary, the invention is capable of opening documents or databases that are closed. Nevertheless, the invention works similarly on maps, windows, documents, and databases.

The computer architecture comprises an event handler that is responsible for causing needed or requested operations to be executed according to an appropriate protocol. Event handlers are well known in the art and are found in all of the most commonly used personal computer operating systems: Windows, Mac-OS, and Unix. The event handler "listens" to events and tracks when input is received that causes the functioning of the invention to begin or that is otherwise relevant to the functioning of the invention. According to some embodiments, the event handler capable of receiving selections of master and slave is comprised in the operating system. Where the event handler capable of receiving selections of master and slave is not incorporated into the operating system, an embodiment of the invention will mimic the functions executed by the event handler when incorporated into the operating system.

Typical Usage

Generally speaking, embodiments of the invention can operate with master and slave documents or databases that are initially either open or closed or both, depending on the operator's desires and the current state of the computing device. If necessary, embodiments of the invention are capable of opening documents that are closed. Nevertheless, the invention works similarly on maps, windows, documents, and databases.

FIG. 1 is an illustration depicting a system, including a display 101 and a user interface 102, that shows how an operator 104 using an embodiment of the invention can execute a master operation 120 on a master map 106 or on a master document or on a master database or in a master window and thereby cause a corresponding operation to be automatically executed on a slave map 110 or on a slave document or on a slave database or in a slave window without having to separately execute the operation on each slave. The operator 104 transmits the master operation 120 to a master document 106. Subsequently, an embodiment of the invention causes a corresponding operation 130 (which may be operation 120) to be transmitted to the slave document 110. In this figure, to simplify matters and, as an example, only one slave document 110 is illustrated. Any number of slave documents 110 could, in fact, be selected.

FIGS. 2A-2D are a series of illustrations that show a more specific example of how an operator 204, using an embodiment of the invention, can cause an operation 220 executed on a master map/document/window/database 206 to be automatically executed on a slave map/document/window/database 210 without having to separately execute the operation on each document or database or in each window. As examples, both master and slave here are maps. This figure illustrates an embodiment in which the master operation and the corresponding operation are the same operation.

In FIG. 2A, operator 204 sends master operation 220 (as an example, a rotation counterclockwise by 23 degrees) to be performed on master 206. Master 206, in this example, comprises five roads 209. In FIG. 2B, master operation 220 is performed on master 206. In FIG. 2C, embodiments of the invention automatically cause corresponding operation 230 (as an example, a rotation that in this case happens to be identical to master operation 220) to be sent to slave 210. Slave 210, in this example, comprises four locations 211. In FIG. 2D, corresponding operation 230 is performed on slave 210.

Various embodiments include, as examples, methods for selecting the master such as executing a master operation on the master, selecting the master, selecting a "corresponding operations-multiple maps/windows/documents/databases" command and then selecting the master, by pre-selecting the master as a default master, and by pre-selecting the master as a default master and opening the master. In one embodiment, an operator's designation of a master operation to be executed on a specific master simultaneously specifies a master operation and selects a master. In one embodiment, any subsequent maps, windows, documents, or databases on which the operator clicks are thereby designated as slave(s). Other methods for selecting the master will be well-known to those skilled in the art. Various embodiments include, as examples, methods for selecting the slave(s) such as operator input, by pre-selecting the one or more slaves as one or more default slaves, and by pre-selecting the one or more slaves as the one or more default slaves and opening the slave. Correspondences may be implemented by saving them in memory or through a side file containing a correspondence between maps, documents, windows, or databases that are operationally connected to each other. The selection of the slave(s) can be visualized as simultaneously creating a connection between the master and each of the slave(s). Other methods for making the selections of the slave(s) will be well-known to those skilled in the art.

Moreover, various embodiments will incorporate the event handler capable of receiving selections of master and slave as part of the operating system, as a separate routine incorporated into other software, as a stand-alone routine, or in other forms. Where the event handler capable of receiving selections of master and slave is part of the operating system, it causes the operating system to execute the requested operations on master and slave(s). The event handler locates all slave(s) and relays to each of them a message directing that an operation be executed on each of them that corresponds to the master operation executed on the master.

FIGS. 3A-3U are a series of illustrations that illustrate in more detail how the system 300 including a display 301 and a user interface 302 operates in an embodiment in which an event handler 308 capable of receiving selections of master and slave is part of the operating system, and in which an operator 304 selects a master 306 and two slaves 310 and 314. In this example, master 306 comprises streets 309, first slave 310 comprises first locations 311, and second slave 314 comprises second locations 317. Although maps are illustrated as an example, the principles are the same for embodiments involving windows, documents, or databases. In this example, the corresponding operations are identical to the master operation. In general, the corresponding operations need not be identical to the master operation and often will not be identical. The operator 304 selects a first slave 310 by creating a first correspondence 312 between the master 306 and the first slave 310, and the operator selects a second slave 314 by creating a second correspondence 316 between the master 306 and the second slave 314. Although FIGS. 3A-3U illustrate two slave maps 310 and 314, any number of slaves equal to or greater than one is possible. Any number of other maps that are not selected by the operator 304 as master 306 or slave 310/314 may again be simultaneously present but are not relevant to the operation of the invention and, thus, are not depicted. In FIG. 3A, the system 300 includes a display 301 and a user interface 302. An operator 304 selects a master 306 and sends to the event handler 308 a master address 320 designating and enabling the location of the master 306. The event handler 308 receives the master address 320. In some embodiments, an input device (not illustrated) will be used to make the designation, while in other embodiments no input device is present and the designation is made by other means such as a set of batch commands (not illustrated) or default selection (not illustrated). In FIG. 3B, the event handler 308 uses the master address 320 to locate and activate the master 306. The activation of the master 306 is symbolically represented in the diagram by a boldface frame around the inside edge of the master 306. In FIG. 3C, the event handler 308 awaits the selection by the operator 304 of a first slave 310. In FIG. 3D, the operator 304 selects the first slave 310, which has a first slave address 330. Through the operation of the invention, first slave address 330 is sent to the event handler 308 designating and enabling the location of the first slave 310. The event handler 308 receives the first slave address 330 from the operator 304 designating and enabling the location of the first slave 310. In FIG. 3E, the event handler 308 uses the first slave address 330 to locate and activate the first slave 310. The activation of the first slave 310 is symbolically represented in the diagram by a boldface frame around the inside edge of the first slave 310. In FIG. 3F, the event handler 308 uses the master address 320 and the first slave address 330 to send an instruction 334 to create a first correspondence 312 between the master 306 and the first slave 310.

In FIG. 3G, the event handler 308 awaits the selection by the operator 304 of a second slave 314. In FIG. 3H, the operator 304 selects the second slave 314, which has a second slave address 340. Through the operation of the invention, second slave address 340 is sent to the event handler 308, designating and enabling the location of the second slave 314. The event handler 308 receives the second slave address 340 from the operator 304 designating and enabling the location of the second slave 314. In FIG. 3I, the event handler 308 uses the second slave address 340 to locate and activate the second slave 314. The activation of the second slave 314 is symbolically represented in the diagram by a boldface frame around the inside edge of the second slave 314. In FIG. 3J, the event handler 308 uses the master address 320 and the second slave address 340 to send an instruction 344 to create a second correspondence 316 between the master 306 and the second slave 314.

In FIG. 3K, the event handler 308 awaits a master operation 350 by the operator 304 on the master 306. In FIG. 3L, the operator 304 selects a master operation 350 (as an example, a counterclockwise rotation by 23 degrees). Through the operation of the invention, master operation 350 is sent to the event handler 308. Event handler 308 receives the master operation 350 and, using the master address 320, locates the master 306 and sends the master operation 350 on to master 306. Master operation 350 is performed on master 306. In FIG. 3M, the master operation 350 has just been performed on master 306. The counter-clockwise rotation of master 306 has rotated the master 306 including each of the streets 309.

In FIG. 3N, the event handler 308 uses the master address 320 to perform the action 356 of checking for and finding the first correspondence 312. In FIG. 3O, the first correspondence 312 enables event handler 308 to retrieve first slave address 330, corresponding to first slave 310. After optionally consulting a matrix of corresponding operations, event handler 308 determines a first corresponding operation 358 to be executed on first slave 310. In FIG. 3P, the event handler 308 sends the first corresponding operation 358 on to be executed on first slave 310. In FIG. 3Q, the first corresponding operation 358 (as an example, also a counter-clockwise rotation) has just been performed on first slave 310. The counter-clockwise rotation of first slave 310 has rotated first slave 310 including each of the first locations 311.

In FIG. 3R, the event handler 308 uses the master address 320 to perform the action 362 of checking for and finding the second correspondence 316. In FIG. 3S, the second correspondence 316 enables event handler 308 to retrieve second slave address 340, corresponding to second slave 314. After optionally consulting a matrix of corresponding operations, event handler 308 determines a second corresponding operation 364 to be executed on second slave 314. In FIG. 3T, the event handler 308 sends the second corresponding operation 364 on to be executed on second slave 314. In FIG. 3U, the second corresponding operation 364 (as an example, also a counter-clockwise rotation) has just been performed on second slave 314. The counter-clockwise rotation of second slave 314 has rotated second slave 314 including each of the second locations 317.

FIGS. 4A-4M are a series of illustrations that illustrate in more detail how the system 400, including a display 401 and a user interface 402, operates in an embodiment in which an event handler 408 capable of receiving selections of master and slave is not part of the operating system, and in which an operator 404 selects a master 406 and a slave 410. In this example, master 406 comprises streets 409, and slave 410 comprises locations 411. Although maps are illustrated as an example, the principles are the same for embodiments involving windows, documents, or databases. In this example, the corresponding operation is identical to the master operation. In general, the corresponding operation need not be identical to the master operation and often will not be identical. The operator 404 selects the slave 410 by creating a correspondence 412 between the master 406 and the slave 410. It is assumed, as an example only, that master 406 and slave 410 are in the same application 413. Although FIGS. 4A-4M illustrate only one slave 410, any number of slave(s) equal to or greater than one is possible. Any number of other documents that are not selected by the operator 404 as master 406 or slave 410 may be simultaneously present but are not relevant to the operation of the invention and thus are not depicted.

In FIG. 4A, the system 400 includes a display 401 and a user interface 402. The operator 404 selects a master 406 and sends to the event handler 408 a master address 420 designating and enabling the location of the master 406. The event handler 408 receives the master address 420. In some embodiments, an input device (not illustrated) will be used to make the designation, while in other embodiments no input device is present and the designation is made by other means such as a set of batch commands (not illustrated) or default selection (not illustrated). In FIG. 4B, the event handler 408 sends the master address 420 to application 413, which uses master address 420 to locate and activate the master 406. The activation of the master 406 is symbolically represented in the diagram by a boldface frame around the inside edge of the master 406. In FIG. 4C, the event handler 408 awaits the selection by the operator 404 of a slave 410. In FIG. 4D, the operator 404 selects a slave 410 having a slave address 430. Through the operation of the invention, slave address 430 is sent to the event handler 408. The event handler 408 receives from the operator 404 the slave address 430 designating and enabling the location of the slave 410. In FIG. 4E, the event handler 408 sends the slave address 430 to application 413. In FIG. 4F, application 413 uses slave address 430 to locate and activate the slave 410. The activation of the slave 410 is symbolically represented in the diagram by a boldface frame around the inside edge of the slave 410. In FIG. 4G, the application 413 uses the master address 420 and the slave address 430 to send an instruction 434 to create a correspondence 412 between the master 406 and the slave 410.

In FIG. 4H, the event handler 408 awaits a master operation by the operator 404 on the master 406. In FIG. 4I, the operator 404 selects a master operation 440 (as an example, a zoom). Through the operation of the invention, master operation 440 is sent to the event handler 408. Event handler 408 receives the master operation 440 and sends the master operation 440 to the application 413. Application 413 executes master operation 440 on master 406. In FIG. 4J, master operation 440 has just been performed on master 406. The zoom of master 406 has resulted in previously visible outer segments of streets 409 disappearing off the outside edges of master 406. In FIG. 4K, the event handler 408 sends an instruction 441 to application 413 to check for a correspondence 412. In FIG. 4L, application 413 uses the master address 420 to perform the action 442 of checking for and finding the correspondence 412. In FIG. 4M, correspondence 412 enables application 413 to retrieve slave address 430, corresponding to slave 410. After optionally consulting a matrix of corresponding operations, application 413 determines a corresponding operation 458 to be executed on slave 410. In FIG. 4N, application 413 executes the corresponding operation 458 on the slave 410. In FIG. 4O, corresponding operation 458 (as an example, also a zoom) has just been performed on slave 410. The zoom of slave 410 has resulted in one previously visible location 411 disappearing off the outside edges of slave 410 and an increased separation between the still visible locations 411.

FIGS. 5A-5E are a series of illustrations of one embodiment of the invention in which the event handler 508 capable of receiving selections of master and slave is part of the operating system (not illustrated), and in which the master document 506 and the slave document(s) 510, 514, and 518 are photographs. In FIG. 5A, the operator 504 transmits a master operation 520 to the event handler 508. In FIG. 5B, the event handler 508 carries out the master operation 520 on the master photograph 506. In FIG. 5C, the event handler carries out a first corresponding operation 558 on the first slave photograph 510. In FIG. 5D, the event handler 500 carries out a second corresponding operation 564 on the second slave photograph 514. In FIG. 5E, the event handler carries out a third corresponding operation 572 on the third slave photograph 518.

FIGS. 6A-6C are a series of screenshots of one embodiment of the invention involving, as an example, three similar word processing documents, first document 606, second document 610, and a third document 614 that highlights the differences between the first two documents. According to this embodiment of the invention, a group of documents is selected prior to operation of the invention. In this case, the group comprises three documents, but any number of documents equal to two or more permits the operation of the invention. The documents are synchronized together so that an operator who scrolls down any one of the documents will automatically cause a corresponding scrolling down to happen simultaneously in each of the other documents. Moreover, every time an operator scrolls down one of the documents, that document becomes the new master document. In this example, first document 606 is the Gettysburg Address as delivered by Abraham Lincoln, second document 610 is an "edited" version of the same speech, and third document 614 compares the differences between first documents 606 and second 610.

FIG. 6A shows screenshots of the beginnings of documents 606, 610 and 614. If an operator scrolls down to the middle of first document 606, an embodiment of the invention causes a scrolling down to automatically be performed to bring into view the corresponding middle sections of second document 610 and third document 614. Conversely, if an operator scrolls down to the middle of second document 610 (or to the middle of third document 614), an embodiment of the invention causes a scrolling down to automatically be performed to bring into view the corresponding middle sections of the other two documents. In any of these cases, FIG. 6B illustrates the screenshots of the corresponding middle sections of documents 606, 610 and 614 that will appear due to the operation of this embodiment of the invention.

If the operator then scrolls down to the bottom of first document 606, an embodiment of the invention causes a corresponding scrolling down to automatically be performed to bring into view the corresponding bottom sections of second documents 610 and third document 614. Conversely, if an operator scrolls down to the bottom of second document 610 (or to the bottom of third document 614), an embodiment of the invention causes a corresponding scrolling down to automatically be performed to bring into view the corresponding bottom sections of the other two documents. In any of these cases, FIG. 6C illustrates the screenshots of the corresponding bottom sections of documents 606, 610 and 614 that will appear due to the operation of this embodiment of the invention.

FIG. 7 is a flow chart that illustrates a simplified summary of the typical flow of a process in accordance with an embodiment of the invention in which an event handler capable of receiving selections of master and slave is part of the operating system. In step 700, an event handler receives a master address corresponding to a selected master. In step 702, the event handler receives one or more slave address(es) corresponding to one or more slave(s). In step 704, the event handler creates correspondence(s) between master and slave(s). In step 706, the event handler receives a master operation. In step 708, the event handler sends the master operation on to be performed on the master, and the master operation is performed on the master. In step 710, the event handler checks for and finds correspondence(s). In step 712, based on the correspondence(s), the event handler sends corresponding operation(s) to be executed on the slave(s). In step 714, the corresponding operation(s) are executed on the slave(s). Any number of slave(s) equal to or greater than one is possible.

FIG. 8 is a flow chart that illustrates a summary of the typical flow of a process in accordance with an embodiment of the invention in which an event handler capable of receiving selections of master and slave is not part of the operating system, and in which an operator selects a master and a slave. In step 800, an event handler receives a master address corresponding to a selected master. In step 802, the event handler receives one or more slave address(es) corresponding to one or more slave(s). In step 804, the event handler creates correspondence(s) between master and slave(s). In step 806, the event handler receives a master operation. In step 808, the event handler sends the master operation to the application, which performs the master operation on the master. In step 810, the application checks for and finds correspondence(s). In step 814, the application(s) execute(s) the corresponding operation(s) on the slave(s). Any number of slave(s) equal to or greater than one is possible. Any number of application(s) equal to or greater than one and equal to or less than the total combined number of master and slave(s) is possible.

FIG. 9 is a flow chart that illustrates in more detail the typical flow of a process in accordance with an embodiment of the invention. FIG. 9 depicts an embodiment in which the event handler capable of receiving selections of master and slave is part of the operating system. As an example, only one slave is illustrated in the figure. Any number of slave(s) equal to or greater than one is possible. As an example, the master and slaves remain the same here, although generally and as illustrated in FIG. 11, the invention permits changes in both master and slave during operation of the invention.

In step 900, an operator selects a master that has a master address. In step 902, an event handler receives the master address. In step 904, using the master address, the event handler locates and activates the master. In step 906, the event handler awaits the operator's selection of a slave. In step 908, the operator selects a slave that has a slave address. In step 910, the event handler receives the slave address. In step 912, using the slave address, the event handler locates and activates the slave. In step 914, using the master address and the slave address, the event handler creates a correspondence between the master and slave. In step 916, it is queried whether there are any more slaves. If the answer is yes, then the process loops back to step 906. If in step 916 the answer is no, then the process continues to step 918. In step 918, the event handler awaits the operator's master operation on the master.

In step 920, the event handler receives the selected master operation. In step 922, the event handler sends the master operation on to be executed on the master, and the master operation is executed on the master. In step 924, the event handler checks for and finds correspondence(s). In step 925, the correspondence(s) enable the event handler to retrieve the slave address.

In step 926, a matrix of corresponding operations is optionally consulted. In step 928, the event handler determines a corresponding operation with regard to the slave. In step 930, the event handler sends the corresponding operation on to be executed on the slave. In step 932 the corresponding operation is executed on the slave. In step 934, it is asked whether there are any more correspondence(s) left to process. Generally speaking, there will be more correspondence(s) left to process when slave(s) are remaining that have not yet been considered, and there will be no more correspondences to process when no slaves are remaining that have not yet been considered. If in step 934 the answer is yes, then the process loops back to step 926. If in step 934 the answer is no, then in step 936, the process is completed.

FIG. 10 is a flow chart that illustrates in more detail the typical flow of a process in accordance with an embodiment of the invention. FIG. 10 depicts an embodiment in which the event handler capable of receiving selections of master and slave is not part of the operating system. As an example, only one slave is illustrated in the figure. Any number of slave(s) equal to or greater than one is possible. Any number of application(s) equal to or greater than one and equal to or less than the total combined number of master and slave(s) is possible. As an example, the master and slaves remain the same here, although generally and as illustrated in FIG. 11, the invention permits changes in both master and slave during operation of the invention.

In step 1000, an operator selects a master that has a master address. In step 1002, an event handler receives the master address. In step 1003, the event handler sends the master address to the application. In step 1004, using the master address, the application locates and activates the master. In step 1006, the event handler awaits the operator's selection of a slave. In step 1008, the operator selects a slave that has a slave address. In step 1010, the event handler receives the slave address. In step 1012, the event handler sends the slave address to the application. In step 1013, the application uses the slave address to locate and activate the slave. In step 1014, using the master address and the slave address, the application creates a correspondence between the master and slave. In step 1016, it is queried whether there are any more slaves. If the answer is yes, then the process loops back to step 1006. If in step 1016 the answer is no, then the process continues to step 1018. In step 1018, the event handler awaits the operator's master operation on the master.

In step 1020, the event handler receives the selected master operation. In step 1022, the event handler sends the master operation to the application, which performs the master operation on the master. In step 1024, the application checks for and finds correspondence(s). In step 1025, the correspondence(s) enable the application to retrieve the slave address.

In step 1026, a matrix of corresponding operations is optionally consulted. In step 1028, the application determines a corresponding operation with regard to the slave. In step 1032, the application performs the corresponding operation on the slave. In step 1034, it is ascertained whether there are any more correspondence(s) left to process. Generally speaking, there will be more correspondence(s) left to process when slave(s) are remaining that have not yet been considered, and there will be no more correspondences to process when no slaves are remaining that have not yet been considered. If in step 1034 the answer is yes, then the process loops back to step 1026. If in step 1034 the answer is no, then in step 1036, the process is completed.

FIG. 11 is a flow chart that illustrates a simplified summary of the typical flow of a process in accordance with an embodiment of the invention, according to which the invention permits changes in both master and slave during operation of the invention.

FIG. 11 depicts an embodiment in which the event handler capable of receiving selections of master and slave is not part of the operating system. In step 1100, an event handler receives selections of files of interest, wherein a file of interest is defined one of a map, a document, a window, and a database. In step 1101, the event handler receives a designation of a master address corresponding to a master (or alternatively, the master is determined by a default). In step 1102, the event handler receives one or more slave address(es) corresponding to one or more slave(s). In step 1104, the event handler creates correspondence(s) between master and slave(s). In step 1106, the event handler receives a master operation. In step 1108, the event handler sends the master operation on to be performed on the master, and the master operation is performed on the master. In step 1110, the event handler checks for and finds correspondence(s). In step 1112, based on the correspondence(s), the event handler sends corresponding operation(s) to be executed on the slave(s). In step 1114, the corresponding operation(s) are executed on the slave(s). In step 1116, the event handler receives an optional revision of selections of files of interest. This revision may comprise one or more of addition of one or more new files of interest, addition of one or more new slaves, removal of one or more existing files of interest, and removal of one or more existing slaves. Any number of slave(s) equal to or greater than one is possible. The number of slaves can change with successive operations of the invention. The process then loops back to step 1101 and the next iteration of the invention begins.

In some embodiments of the invention, the event handler capable of receiving selections of master and slave is part of the operating system and in other embodiments, it is separate from the operating system. Where the event handler capable of receiving selections of master and slave is part of the operating system, the event handler directly causes other segments of the operating system to execute the requested master operation on the master and to execute the corresponding operation(s) on the slave(s). The event handler locates all slave(s) and relays to each of them a message directing that an appropriate corresponding operation be executed on each of them that corresponds to the master operation executed on the master.

In some embodiments the corresponding operation to be executed on a slave may be identical to the master operation executed on the master. This is likely to be true where the master and slave are both operating in the same application, and may be true as well where the master and slave are documents that operate in different applications. In other embodiments, that will not be true and for one or more of the slaves, the corresponding operation will be different from the master operation. In one embodiment, the system includes a matrix of corresponding operations, which is optionally consulted by the event handler to determine which corresponding operation corresponds to the master operation.

All embodiments operate with one master and with one or more slave(s). It should be understood that master and slave are designations that may only last for the duration of a particular use of the invention. Master and slave are not necessarily permanent or even semi-permanent designations. A map, window, document or database that is the master in one use of the invention could be the slave in the next use of the invention. Similarly, a map, window, document or database that is the slave in one use of the invention could be the master in the next use of the invention. Moreover, although there is only one master for a given use of the invention, any number of slave(s) may be present. For simplicity, in some diagrams we have limited ourselves to one slave, but this is purely for convenience only and does not reflect any limitation of the invention. One or more slaves are possible for a given embodiment.

Additionally, no specific input device is associated with the invention. As is known to those skilled in the art, a virtually limitless variety of input device can be used in conjunction with embodiments of the present invention to enable the operator to select master, slave, and master operation. Examples of input devices that may be used include a mouse, a keyboard, a touchpad, a data glove, a voice interface, and a stylus on a personal digital assistant (PDA). Moreover, embodiments of the invention may operate without any input device at all, according to embodiments in which master and slave and master operation are selected without use of an input device. In one embodiment, a master and a slave are pre-selected as defaults and are opened up by the operating system. In this embodiment, the operator inputs the master operation although that can also be set by default.

As is known to those skilled in the art, a virtually limitless variety of input modes are available for a given input device. A mouse may be designed so that the selection of master and slave(s) is done with a left click, a center click, a right click, or any one of a large set of other possibilities. As will be well-known to those skilled in the art, the specific type of input device and input mode does not substantially affect the functioning of the invention.

Various embodiments include, as examples, methods for selecting the master such as executing a master operation on the master, operator input designating the master, selecting a "corresponding operations-multiple maps/windows/documents/databases" command and then selecting the master, by pre-selecting the master as a default master, and by pre-selecting the master as a default master and opening the master. Other methods for selecting the master will be well known to those skilled in the art. Various embodiments include, as examples, methods for selecting the slave(s) such as operator input designating the slave, selecting a "corresponding operations-multiple maps/windows/documents/databases" command and then selecting the slave, pre-selecting the one or more slaves as one or more default slaves, and by pre-selecting the one or more slaves as the one or more default slaves and opening the master. The selection of the slave(s) can be conceptualized as simultaneously creating a correspondence between the master and each of the slave(s). Other methods for making the selections of the slave(s) will be well known to those skilled in the art. Moreover, various embodiments will incorporate the event handler function as part of the operating system, as a separate routine incorporated into other software, as a stand-alone routine, or in other forms. Other embodiments incorporating the event handler function into the system will be well known to those skilled in the art.

In certain embodiments, the master will be selected by default. In certain embodiments, the operator selects the slave by creating a correspondence between the master and each of the one or more slaves. As an example, one way to do this is to include a menu item that the operator can select that "corresponds this master window [or document or database] with others." Selection of this menu item notifies the event handler that any other map, window, document or database on which the operator clicks now is not being requested for focus but rather is being designated for correspondence with the master. Correspondences may be implemented through a side file containing correspondences between maps, windows, documents, or databases that are operationally connected.

In another set of embodiments, the master and the one or more slaves are selected by the operator as files of interest, wherein a file is defined as one of a map, a document, a window, and a database. According to this set of embodiments, the master is subsequently selected from among said files of interest.

According to another set of embodiments, the selection of the master is subject to change on subsequent applications of the method disclosed by the invention. According to another set of embodiments, the selection of the one or more slaves is subject to change on subsequent applications of the method disclosed by the invention. This can be accomplished by one or more of adding one or more slaves to the files of interest or to the slaves, and deleting one or more existing slaves from the files of interest or from the slaves.

In one embodiment, the operation that is executed on master and slave(s) is a drag and drop. In another embodiment, the operation that is executed on master and slave(s) is a cut and paste. In another embodiment, the operation that is executed on master and slave(s) is a paste.

In one embodiment, where at least one map, window, document or database is open, the master is designated by a selection of the operator, using an input device or by other means. According to this embodiment, simply by designating a master operation to be executed on a specific master, the operator has simultaneously specified a master operation and has selected a master. In one embodiment, any subsequent maps, windows, documents, or databases on which the operator clicks are thereby designated as slave(s).

In another embodiment, the operator may actively select the mode of corresponding operations-multiple maps/windows/documents/databases," and only after that mode is selected does the option become operational of designating a master and a master operation through input device selection.

According to another set of embodiments, the operator actively selects the master by inputting a specific master operation to be executed on a specific master. In some embodiments, all slave(s) are then set by default. In some embodiments, the default cannot be overridden except by initiating another master operation. In another set of embodiments, the default may be overridden by operator input.

In another embodiment, the operator actively selects the master by inputting a specific master operation to be executed on a specific master. The slave(s) are manually selected. If no slave(s) are selected, the invention does not function.

In another embodiment, a pre-selected master functions as the default selection that must be overridden if a different master is desired.

In one embodiment, only pre-selected default slave(s) that are open are used. The operator may be queried as to whether he or she wishes to select further slave(s) and also whether he or she wishes to remove any of the pre-designated slave(s).

In another embodiment, if no slave(s) are open, the invention simply does not operate. In this embodiment, a corresponding operation can occur only on a document that is open.

In one embodiment, a default master is used as the master only, if it is open. In this embodiment, if the default master is not open, the operator is prompted to select an open master.

In another embodiment, the master operation is selected by default. In one embodiment, the selection may be overridable by operator input. In other embodiments, if no master operation is selected or if the operation is meaningless on master and slave(s), the invention fails to function.

In one embodiment of the invention, the documents used are created in a word processing program such as Microsoft Word or Corel Word Perfect. According to this embodiment of the invention, a group of documents is selected prior to operation of the invention. The documents are synchronized together so that an operator who scrolls down any one of the three documents will automatically cause a corresponding scrolling down to happen simultaneously in each of the other documents. Moreover, every time an operator scrolls down one of the documents, that document becomes the new master document. As one example, the selected group of documents comprises two similar but non-identical versions of the same document, plus a third document comparing the differences between documents 1 and 2.

When all three documents are on the screen in separate windows, the invention allows for a scrolling down through any one of the three documents to cause a corresponding scrolling down to happen virtually simultaneously in the other two documents. All three documents are synchronized together so that an operator who scrolls down any one of the three documents will cause a corresponding scrolling down to happen simultaneously in the other two documents. In an example of this embodiment illustrated in FIG. 6, document 606 is the Gettysburg Address as delivered by Abraham Lincoln, document 610 is an "edited" version of the same speech, and document 614 compares the differences between documents 606 and 610.

In one embodiment of the invention, the master and the one or more slave(s) are photographs. A master operation that is executed on a master photograph is executed in its corresponding form on slave photographs.

In another embodiment of the invention, the master window and the one or more slave window(s) all show different views of the same photograph. A master operation that is executed on a master window is executed in its corresponding form on slave windows.

In some embodiments of the invention, a master window and/or slave window(s) display electronic maps. The different windows may display different views of the same map or views of different maps (or, trivially, the same views of the same map). The invention functions identically regardless of whether the maps depicted in the various windows are the same or not.

As shown in FIGS. 7 and 8 (and in more detail in FIGS. 9 and 10), the process typically begins by the computer system or on other processor executing an embodiment of the invention, displaying or providing a means for allowing an operator to select a master. However, embodiments do exist in which the master and/or one or more slave(s) and/or the master operation may be selected by default. In a typical implementation, the operator uses a computer system that includes a computer display, and some form of graphical interface executing thereon, for example, a Unix Windows environment, a Mac OS, or a Microsoft Windows environment or some other graphical application environment. It will be evident to one skilled in the art that embodiments of the invention can be equally used with other forms of graphical operator interface (GUI). Other implementations of the invention can be designed for use with specific graphical devices and systems for example with in-car navigation systems, or with specialized navigation systems for use in marine, aviation, navigation, and military applications.

System Implementation

FIG. 12 is a block diagram that schematically illustrates, as an example, a system 1200 that can be used with an embodiment of the invention, including an optional matrix of corresponding operations 1214 to which reference can be made in determining the corresponding operation(s) to be executed on slave(s) 1210. There is not necessarily any relationship between different elements in matrix 1214. Specifically, even where master and slave(s) are the same type of map/window/document/database, reversing slave and master may lead to an utterly different value of matrix 1214 and thus a completely different corresponding operation. A matrix of corresponding operations 1214 for an application involving N maps/windows/documents/databases must account for all possible permutations of the maps/windows/documents/databases. The dimension of matrix 1214 for an application involving N windows/documents/databases will be $N^2$. In those cases in which the corresponding operation is the same in all cases as the master operation, the matrix of corresponding operations 1214 is an identity matrix.

Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In one set of embodiments, at least one slave is not on the same computer as the master. In another set of embodiments, the system may comprise at least two computers. In certain sets of embodiments, the at least two computers communicate by means of a remote communication system. In one set of embodiments, the remote communication system is one of the Internet, an intranet, and another interconnected network. In another set of embodiments, the remote communication system is a windowing system. In another set of embodiments, the remote communication system is an operating system.

The system 1200 allows for corresponding operations to be executed in multiple windows or on multiple documents or on multiple databases in accordance with various embodiments of the invention. As an example, only one slave 1210 is illustrated in the figure. Any number of slave(s) 1210 equal to or greater than one is possible.

As shown in FIG. 12, the system 1200 typically includes a computing device 1205 which may comprise one or more of an event handler 1216, one or more memories 1218, one or more processors 1219, and one or more storages or repositories 1220 of some sort. The system may further include a display device 1222, including a graphical operator interface or GUI 1223 operating thereon by which the system can display master 1208, slave(s) 1210, and other information.

The system 1200 shown can be used to display to an operator 1204 a master 1206 and a slave 1210 as well as optionally providing a means to select a master operation. Master 1206 and/or slave(s) 1210 may be retrieved from external storage 1203 (which in some instances may be the same storage as storage 1220). FIG. 12 also illustrates an optional matrix of corresponding operations 1214 external to the logic of the system that is then used to determine the corresponding operation.

In some embodiments, the system further includes one or more apparatuses capable of receiving instructions from the operator needed to operate embodiments of the invention such as designations of master, slave, master operation, and/or desired embodiment of the invention. Such apparatuses can include a range of input devices familiar to those skilled in the art such as a mouse, a keyboard, a touchpad, a data glove, a voice interface, and a stylus on a personal digital assistant (PDA). Embodiments of the invention also offers the ability to function without an input device, via a range of possibilities including default designations of master, slave(s), and or master operation.

Appropriate software coding can readily be prepared by skilled programmers based on the teachings of the present disclosure, as will be apparent to those skilled in the software art. Embodiments of the invention may also be implemented by the preparation of application specific integrated circuits or by interconnecting an appropriate network of conventional component circuits, as will be readily apparent to those skilled in the art.

Embodiments of the present invention include a computer program product which is a storage medium (media) having instructions stored thereon/in which can be used to program a computer to execute any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Embodiments of the present invention include software, stored on any one of the computer readable medium (media), for controlling both the hardware of the general purpose/specialized computer or microprocessor, and for enabling the computer or microprocessor to interact with a human operator or other mechanism utilizing the results of the present invention. Such software may include, but is not limited to, device drivers, operating systems, and user applications. Ultimately, such computer readable media further includes software for executing the present invention, as described above.

Included in the programming (software) of the general/specialized computer or microprocessor are software modules for implementing the teachings of the present invention including, but not limited to, allowing the operator to select the master, one or more slave(s), and/or the master operation, either by default or through direct selection; storing correspondence(s) between master and slave(s); arranging to execute the master operation on the master; and arranging to automatically execute corresponding operation(s) on the one or more slave(s) according to the processes of the present invention. In one set of embodiments, the software modules are comprised within the operating system library. In another set of embodiments, the software modules are separate from the operating system. In another set of embodiments, software modules are comprised within the operating system library and other software modules are separate from the operating system.

Embodiments of the present invention may be conveniently implemented using a conventional general purpose or a specialized digital computer or microprocessor programmed according to the teachings of the present disclosure, as will be apparent to those skilled in the computer art.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that the above described system and method for executing corresponding operation(s) on multiple documents or in multiple windows can be incorporated into other types of software applications beyond those described. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. In one or more computers, a method for automatically executing one of a set of one or more corresponding operations on each of one or more slaves, wherein each said slave is one of a slave map, a slave window, a slave document, and a slave database, comprising the steps of:
   in one or more computers, displaying a user interface and a plurality of windows for displaying content of maps, and for allowing an operator to manipulate the content therein;
   receiving a selection by an operator designating, from within the plurality of windows, a master window, wherein said master window displays a map or a portion of the map;
   receiving one or more selections by said operator, wherein each of said one or more selections designates, from within the plurality of windows, one or more slave windows, wherein each of the slave windows displays a different second map or second portion of the map;
   defining one or more associations between the master window and the designated slave windows, to register the designated slave windows to receive notification of operations performed in the master window;
   receiving, via an event handler, notification of a master operation designated by said operator to be executed within said master window on the map therein; and
   automatically executing corresponding operations within each of said one or more registered slave windows on the second map or second portion therein.

2. The method of claim 1, wherein said operator selects said master by executing said master operation on said master window which automatically selects that window as the master window.

3. The method of claim 1, wherein said operator selects said master by manually selecting said master window, prior to performing an operation therein.

4. The method of claim 1, wherein said operator selects said master by pre-selecting said master as a default master.

5. The method of claim 1, wherein said operator selects said one or more slaves by pre-selecting said one or more slaves as one or more default slaves.

6. The method of claim 1, wherein said corresponding operation is determined by reference to a matrix of corresponding operations.

7. The method of claim 1, wherein said operator selects said master operation by pre-selecting said master operation as a default master operation.

8. The method of claim 1, wherein said master and said one or more slaves are selected by said operator as files of interest, wherein a file is defined as one of a map, a document, a window, and a database, and wherein said master is subsequently selected from among said files of interest.

9. The method of claim 8, wherein said selection of said master is subject to change on subsequent applications of said method, by selecting a different one of the plurality of windows as the master window for subsequent operations.

10. The method of claim 1, in which the steps of receiving a selection by an operator designating a master and receiving a master operation designated by said operator are performed simultaneously.

11. The method of claim 1, wherein said master is a master window displaying an electronic map.

12. The method of claim 1, wherein at least one of said one or more slaves is a slave window displaying an electronic map.

13. The method of claim 1, wherein at least one said slave is on a different computer from said master, and wherein said system comprises at least two computers.

14. The method of claim 13, wherein said remote communication system is one of the Internet, an intranet, and another interconnected network.

15. In one or more computers, a method for automatically executing one of a set of one or more corresponding operations on each of one or more slaves, wherein each said slave is one of a slave map, a slave window, a slave document, and a slave database, comprising the steps of:
   in one or more computers, displaying a user interface and a plurality of windows for displaying content of maps, and for allowing an operator to manipulate the content therein, and receiving a selection by an operator designating, from within the plurality of windows, a master, wherein said master is one of a master window, a master document, and a master database;
   receiving one or more selections by said operator, wherein each of said one or more selections designates, from within the plurality of windows, one of said one or more slaves;
   defining one or more associations between the master window and the designated slave windows, to register the designated slave windows to receive notification of operations performed in the master window;
   receiving a master operation, such as a zoom, pan, rotation, or resize, designated by said operator to be executed on said master;
   opening all of said one or more slaves that are not currently open; and
   automatically executing corresponding operations on each of said one or more registered slave windows, such as a corresponding zoom, pan, rotation, or resize of the content therein.

16. In one or more computers, a system for automatically executing one of a set of one or more corresponding operations on each of one or more slaves, wherein each said slave is one of a slave map, a slave window, a slave document, and a slave database, comprising:
   one or more processors capable of
   displaying a user interface and a plurality of windows for displaying content of maps, and for allowing an operator to manipulate the content therein;
   receiving a selection by an operator designating, from within the plurality of windows, a master window, wherein said master window displays a map or a portion of the map;
   receiving one or more selections by said operator, wherein each of said one or more selections designates, from within the plurality of windows, one or more slave windows, wherein each of the slave windows displays a different second map or second portion of the map;
   defining one or more associations between the master window and the designated slave windows, to register the designated slave windows to receive notification of operations performed in the master window;

receiving, via an event handler, notification of a master operation designated by said operator to be executed within said master window on the map therein; and automatically executing corresponding operations within each of said one or more registered slave windows on the second map or second portion therein.

17. The system of claim 16 further including:

an event handler capable of receiving said master operation and capable of transmitting said operation to said one or more processors.

18. The system of claim 16, wherein said event handler is part of an operating system.

19. The system of claim 16, wherein said event handler is not part of an operating system.

20. A system for automatically executing corresponding operations on multiple maps or documents displayed in windows, comprising:

a computer that includes a processor, computer display and user interface operating thereon, wherein the user interface further includes a plurality of windows for displaying content of maps or other documents, and for allowing an operator to manipulate the content therein;

a master window, selected by the operator from the plurality of windows displayed on the user interface, wherein the master window displays a first set of content from the maps or other documents;

one or more slave windows, also selected by the operator from the plurality of windows displayed on the user interface, wherein each of the slave windows displays a second or subsequent set of content from the maps or other documents;

a data optionally defining one or more associations between the master window and the slave windows, and allowing the operator to register particular ones of the slave windows to receive notification of operations performed in the master window;

an event handler that determines when the operator manipulates by an operation upon the first set of content displayed in the master window, such as a zoom, pan, rotation, or resize of the content therein, and provides a notification of those operations to the registered slave windows; and wherein the system receives notification of operations from the event handler and then makes corresponding operations in the one or more slave windows registered as slaves, such as a corresponding zoom, pan, rotation, or resize of the second or subsequent set of content therein.

21. The system of claim 20, wherein the one or more slave windows are a plurality of slave windows, and wherein a subset of the plurality of slave windows can be selected by the operator and registered to receive notification of a particular operation performed in the master window, while the remaining slave windows are unchanged by operations in the master window, for the duration of the particular operation.

22. The system of claim 20, wherein each of the master windows and slave windows displays portions of a map content from a digital or electronic map, and wherein the operator can manipulate by an operation upon a first map portion in the master window, such as a zoom, pan, rotation, or resize of the map therein, and wherein the system then makes corresponding operations in the one or more slave windows registered as slaves, such as a corresponding zoom, pan, rotation, or resize of the second map portion therein.

23. The system of claim 20, wherein the master window and the slave windows show either different maps or other documents, or different views of the same map or document, and wherein when an operation is performed upon the first set of content displayed in the master window, the system automatically translates that operation to a corresponding operation upon the different map, document, or different views of the same map or document, in the slave windows.

24. A method for automatically executing corresponding operations on multiple maps or documents displayed in windows, comprising the steps of:

displaying a user interface that further includes a plurality of windows for displaying content of maps or other documents, and for allowing an operator to manipulate the content therein;

displaying a master window, selected by the operator from the plurality of windows displayed on the user interface, wherein the master window displays a first set of content from the maps or other documents;

displaying one or more slave windows, also selected by the operator from the plurality of windows displayed on the user interface, wherein each of the slave windows displays a second or subsequent set of content from the maps or other documents;

optionally defining one or more associations between the master window and the slave windows, and allowing the operator to register particular ones of the slave windows to receive notification of operations performed in the master window;

determining when the operator manipulates by an operation upon the first set of content displayed in the master window, such as a zoom, pan, rotation, or resize of the content therein, and provides a notification of those operations to the registered slave windows; and upon receiving notification of operations from the event handler, then making corresponding operations in the one or more slave windows registered as slaves, such as a corresponding zoom, pan, rotation, or resize of the second or subsequent set of content therein.

25. The method of claim 24, wherein the one or more slave windows are a plurality of slave windows, and wherein a subset of the plurality of slave windows can be selected by the operator and registered to receive notification of a particular operation performed in the master window, while the remaining slave windows are unchanged by operations in the master window, for the duration of the particular operation.

26. The method of claim 24, wherein each of the master windows and slave windows displays portions of a map content from a digital or electronic map, and wherein the operator can manipulate by an operation upon a first map portion in the master window, such as a zoom, pan, rotation, or resize of the map therein, and wherein the system then makes corresponding operations in the one or more slave windows registered as slaves, such as a corresponding zoom, pan, rotation, or resize of the second map portion therein.

27. The method of claim 24, wherein the master window and the slave windows show either different maps or other documents, or different views of the same map or document, and wherein when an operation is performed upon the first set of content displayed in the master window, the system automatically translates that operation to a corresponding operation upon the different map, document, or different views of the same map or document, in the slave windows.

28. A computer readable medium, including instructions stored thereon which when read and executed by a computer cause the computer to perform the steps of:

displaying a user interface that further includes a plurality of windows for displaying content of maps or other documents, and for allowing an operator to manipulate the content therein;

displaying a master window, selected by the operator from the plurality of windows displayed on the user interface, wherein the master window displays a first set of content from the maps or other documents;

displaying one or more slave windows, also selected by the operator from the plurality of windows displayed on the user interface, wherein each of the slave windows displays a second or subsequent set of content from the maps or other documents;

optionally defining one or more associations between the master window and the slave windows, and allowing the operator to register particular ones of the slave windows to receive notification of operations performed in the master window;

determining when the operator manipulates by an operation upon the first set of content displayed in the master window, such as a zoom, pan, rotation, or resize of the content therein, and provides a notification of those operations to the registered slave windows; and upon receiving notification of operations from the event handler, then making corresponding operations in the one or more slave windows registered as slaves, such as a corresponding zoom, pan, rotation, or resize of the second or subsequent set of content therein.

29. The computer readable medium of claim 28, wherein the one or more slave windows are a plurality of slave windows, and wherein a subset of the plurality of slave windows can be selected by the operator and registered to receive notification of a particular operation performed in the master window, while the remaining slave windows are unchanged by operations in the master window, for the duration of the particular operation.

30. The computer readable medium of claim 28, wherein each of the master windows and slave windows displays portions of a map content from a digital or electronic map, and wherein the operator can manipulate by an operation upon a first map portion in the master window, such as a zoom, pan, rotation, or resize of the map therein, and wherein the system then makes corresponding operations in the one or more slave windows registered as slaves, such as a corresponding zoom, pan, rotation, or resize of the second map portion therein.

31. The computer readable medium of claim 28, wherein the master window and the slave windows show either different maps or other documents, or different views of the same map or document, and wherein when an operation is performed upon the first set of content displayed in the master window, the system automatically translates that operation to a corresponding operation upon the different map, document, or different views of the same map or document, in the slave windows.

* * * * *